(12) United States Patent
Kim

(10) Patent No.: US 8,174,704 B2
(45) Date of Patent: May 8, 2012

(54) OPTICAL IMAGING SYSTEM BASED ON COHERENCE FREQUENCY DOMAIN REFLECTOMETRY

(76) Inventor: Tae Geun Kim, Seoul (KR)

( * ) Notice: Subject to any disclaimer, the term of this patent is extended or adjusted under 35 U.S.C. 154(b) by 390 days.

(21) Appl. No.: 12/515,917

(22) PCT Filed: Dec. 27, 2007

(86) PCT No.: PCT/KR2007/006877
§ 371 (c)(1),
(2), (4) Date: May 21, 2009

(87) PCT Pub. No.: WO2008/084929
PCT Pub. Date: Jul. 17, 2008

(65) Prior Publication Data
US 2010/0033730 A1    Feb. 11, 2010

(30) Foreign Application Priority Data
Jan. 8, 2007    (KR) .................. 10-2007-0002126

(51) Int. Cl.
*G01B 9/02* (2006.01)
(52) U.S. Cl. ..................................................... 356/497
(58) Field of Classification Search .................. 356/479, 356/497
See application file for complete search history.

(56) References Cited

U.S. PATENT DOCUMENTS

| | | | |
|---|---|---|---|
| 4,830,486 A | 5/1989 | Goodwin et al. | |
| 5,114,226 A * | 5/1992 | Goodwin et al. | 356/4.09 |
| 6,160,826 A * | 12/2000 | Swanson et al. | 372/20 |
| 6,600,564 B1 | 7/2003 | Wang et al. | |
| 7,099,358 B1 | 8/2006 | Chong | |
| 2004/0239942 A1 | 12/2004 | Sun | |
| 2007/0002327 A1 | 1/2007 | Zhou et al. | |
| 2009/0091811 A1* | 4/2009 | Asundi et al. | 359/15 |

FOREIGN PATENT DOCUMENTS

JP    07-063506    3/1995

OTHER PUBLICATIONS

Guy Indebetouw et al., Imaging Properties of Scanning Holographic Microscopy, J. Opt. Soc. Am. A, pp. 380-390, vol. 17, No. 3, Mar. 2000.

Michael A. Choma, Sensitivity Advantage of Swept Source and Fourier Domain Optical Coherence Tomography, Optics Express, pp. 2183-2189, vol. 11, No. 18, Sep. 8, 2003.

(Continued)

*Primary Examiner* — Hwa Lee
(74) *Attorney, Agent, or Firm* — Cantor Colburn LLP

(57) ABSTRACT

Provided is an optical imaging system based on a coherence frequency domain reflectometry, including: a light source generating an electromagnetic wave; a splitting unit splitting the electromagnetic wave into first and second beams; a reflecting unit reflecting the first beam and re-transmitting the reflected first beam to the splitter; an objective lens projecting the second beam onto an object to be recorded; a photodetector transforming an interference pattern into a current signal, wherein the first beam reflected from the reflector interferes with the second beam reflected from the object to generate the interference pattern; and an electronic processing unit processing the current signal to generate an image of the object from the interference pattern. Therefore, a lateral resolution can be improved, and Rayleigh limits can be overcome.

46 Claims, 7 Drawing Sheets

OTHER PUBLICATIONS

R. Huber et al., Three-dimensional and C-mode OCT imaging with a compact, frequency swept laser source at 1300 nm, Optics Express, pp. 10523-10538, vol. 13, No. 26, Dec. 26, 2005.
Guy Indebetouw et al., Scanning Holographic Microscopy with Transverse Resolution Exceeding The Rayleigh Limit and Extended Depth of Focus, J. Opt. Soc. Am. A, pp. 892-898,vol. 22, No. 5, May 2005.
R. Huber et al., Fourier Domain Mode Locking (FDML): A new laser operating regime and applications for optical coherence tomography, Optics Express, pp. 3225-3237, vol. 14, No. 8, Apr. 17, 2006.
Daniel L. Marks et al., Inverse Scattering for Rotationally Scanned Optical Coherence Tomography, J. Opt. Soc. AM. A, pp. 2433-2439, vol. 23, No. 10, Oct. 2006.
Fucai Zhang et al., Reconstruction algorithm for high-numerical-aperture holograms with diffraction-limited resolution, Optics Letters, pp. 1633-1635,vol. 31, No. 11, Jun. 1, 2006.
International Search Report—PCT/KR2007/006877 dated Mar. 26, 2008.
Written Opinion—PCT/KR2007/006877 dated Mar. 26, 2008.

* cited by examiner

[FIG. 1]
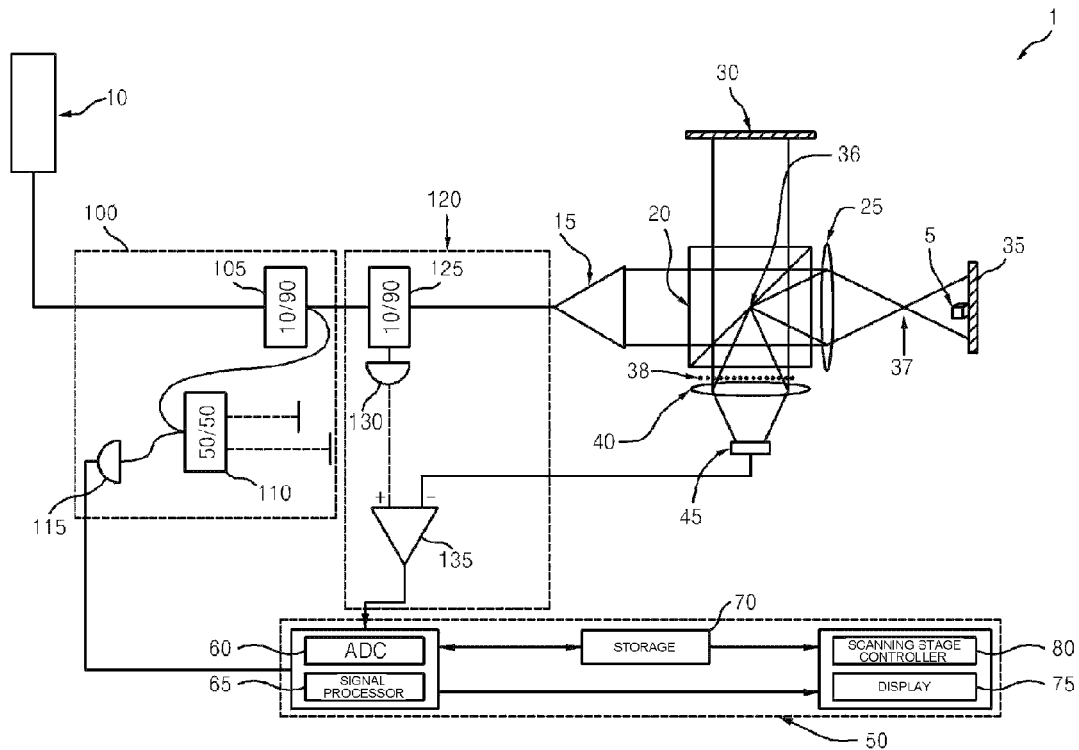
[FIG. 2]
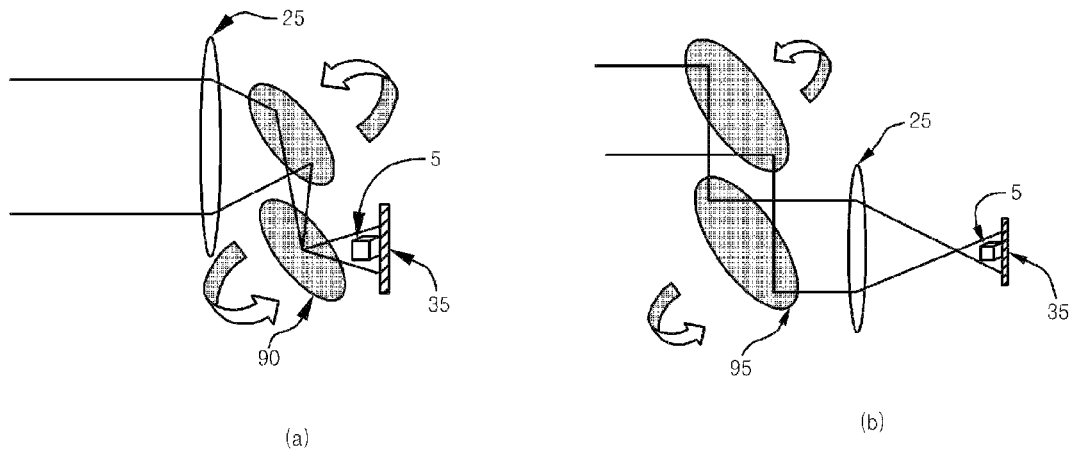
(a)　　　　　　　　　　　　(b)

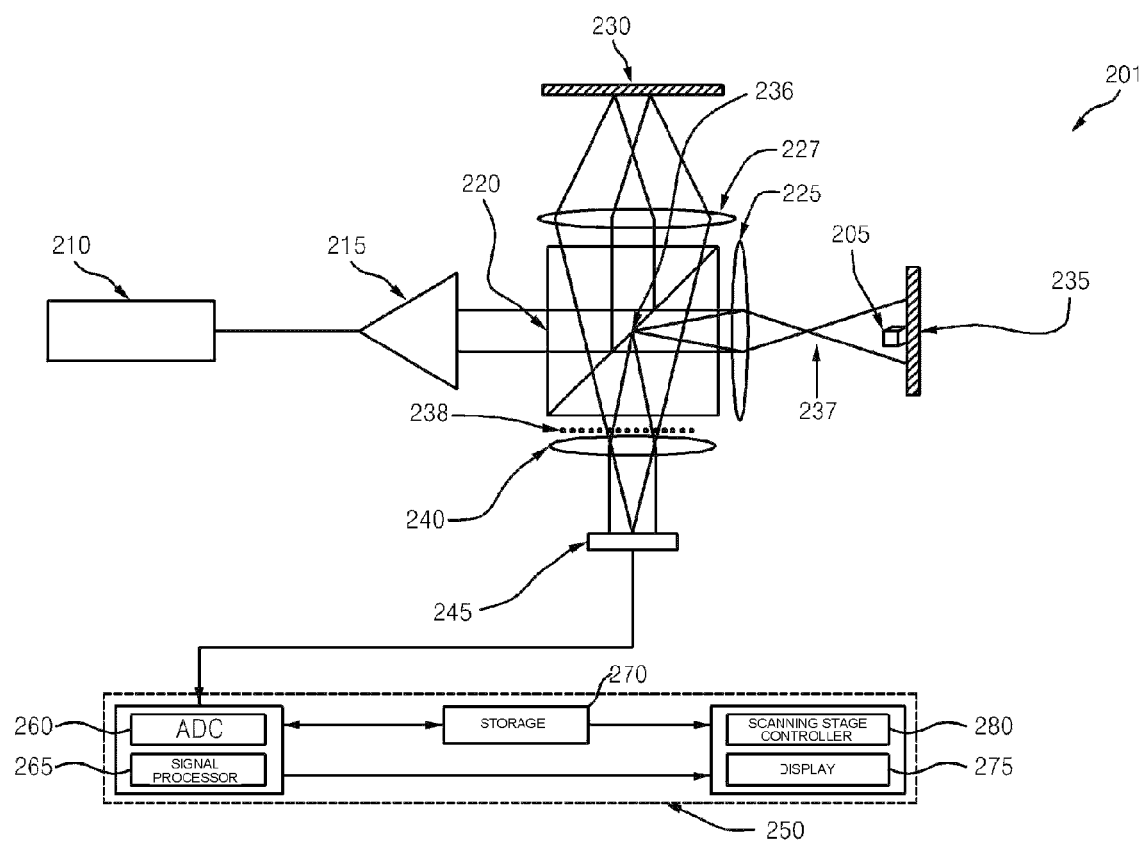

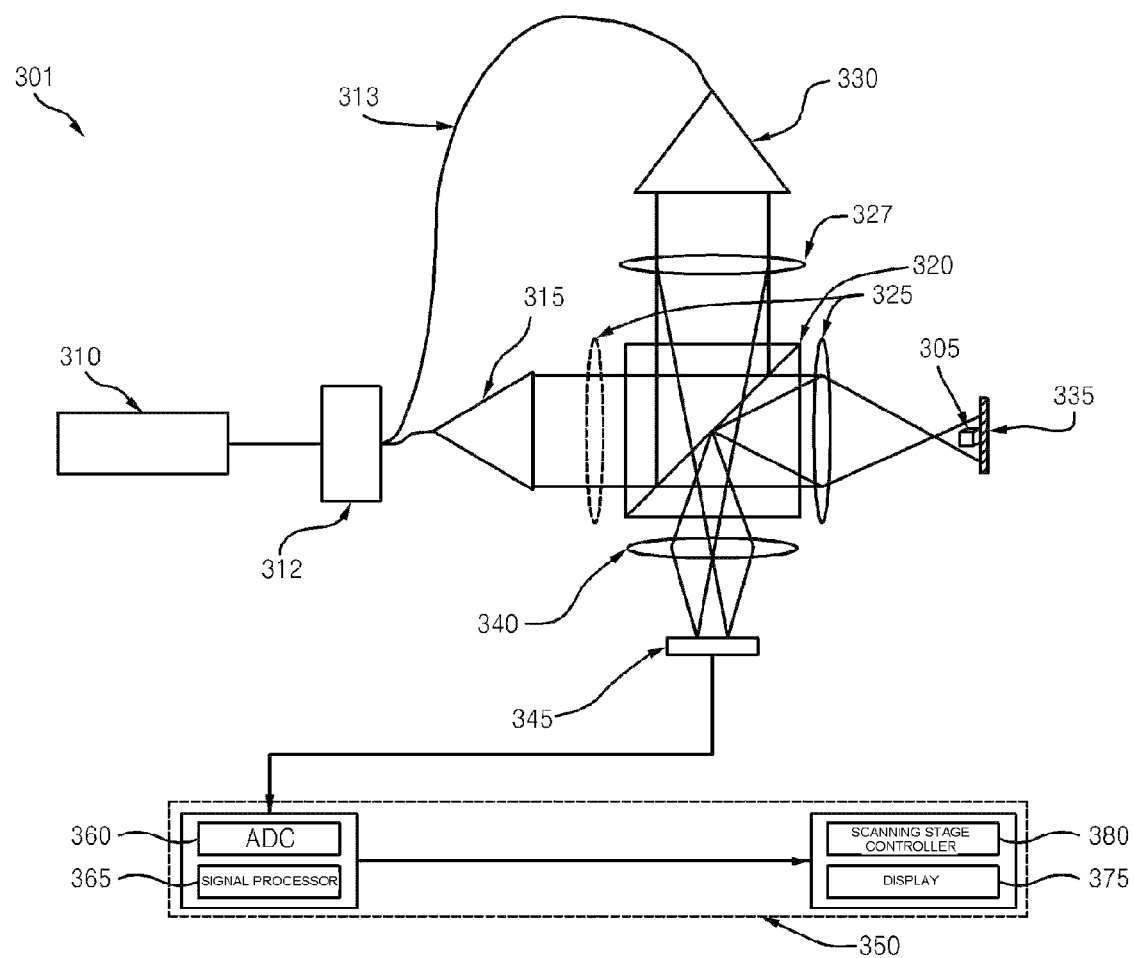
[FIG. 4]

[FIG. 5]
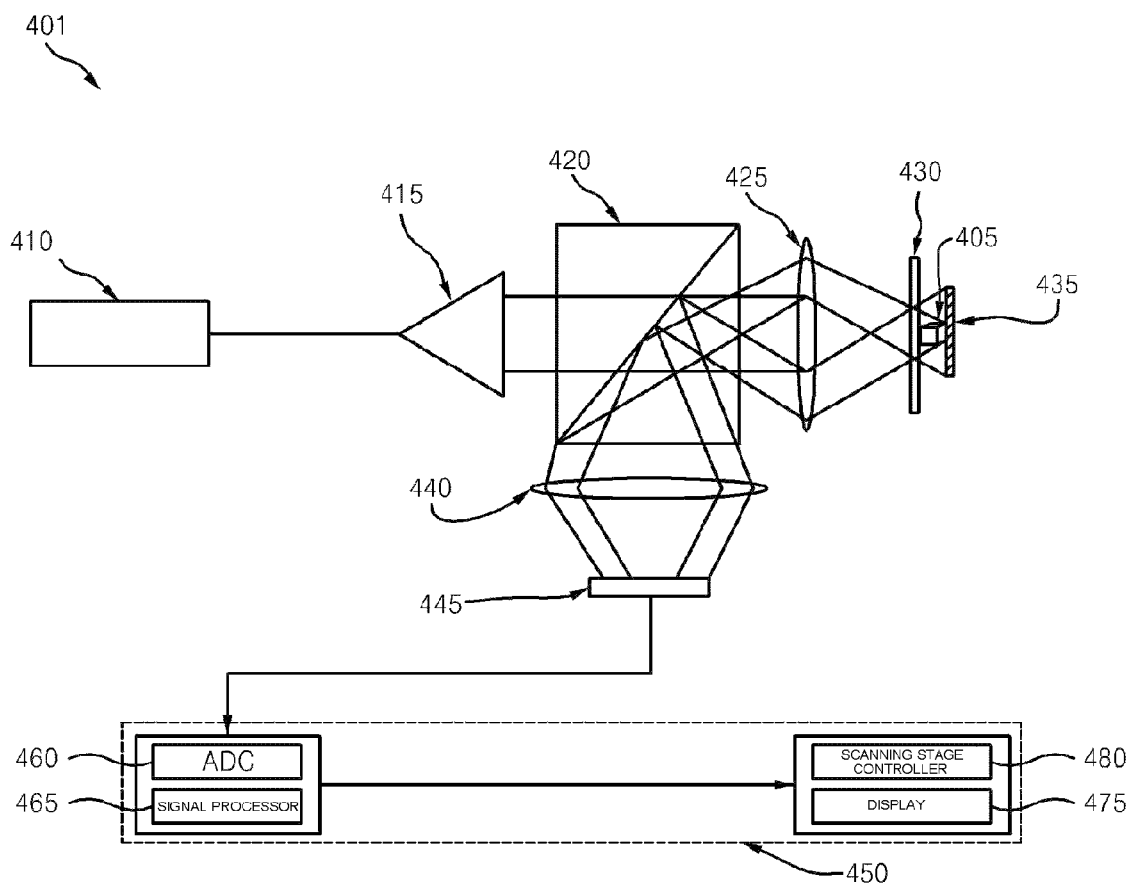

[FIG. 6]
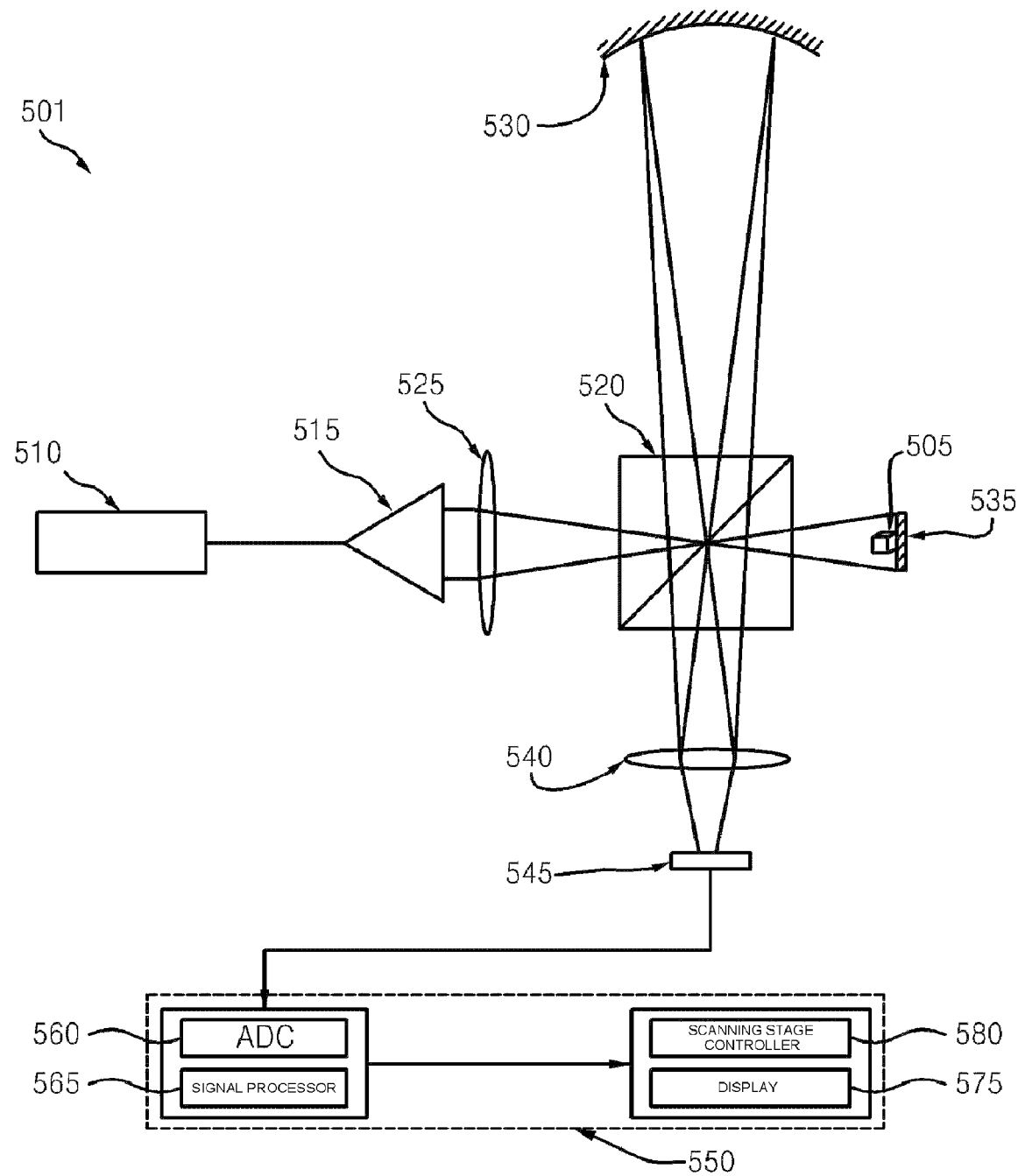

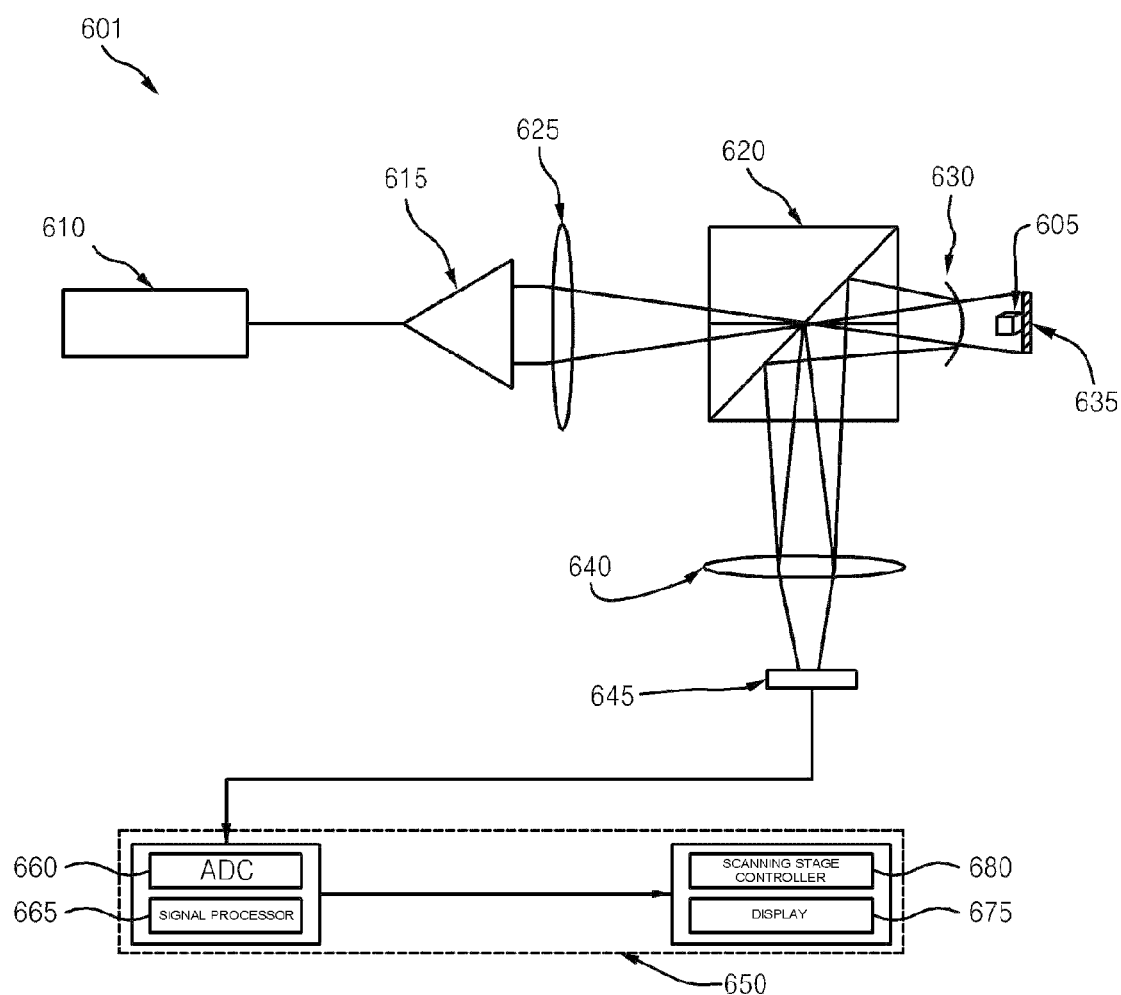

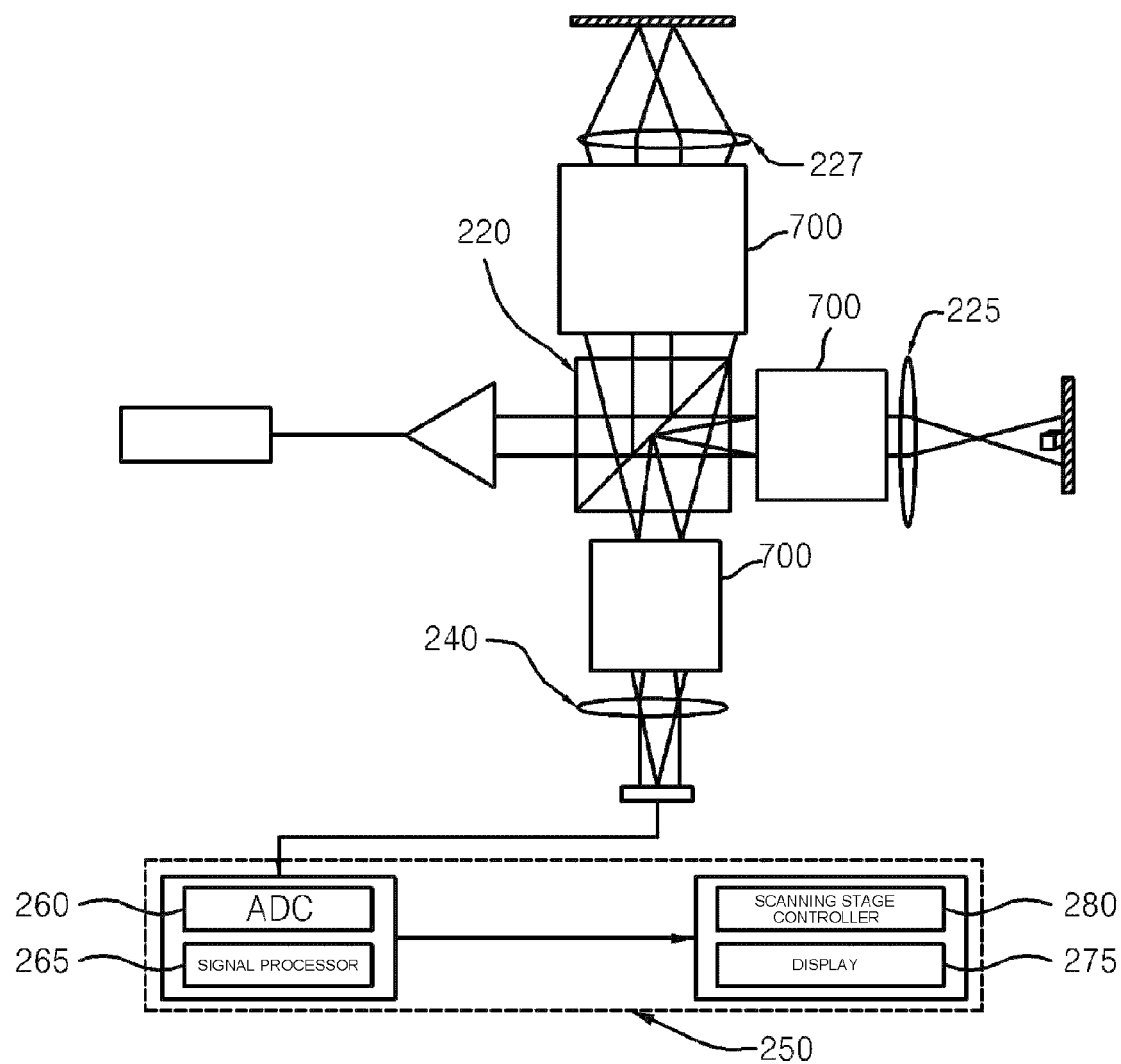
[FIG. 8]

OPTICAL IMAGING SYSTEM BASED ON COHERENCE FREQUENCY DOMAIN REFLECTOMETRY

TECHNICAL FIELD

The present invention relates to an optical imaging system based on a coherence frequency domain reflectometry, and more particularly, to an optical imaging system based on a coherence frequency domain reflectometry, for improving a lateral resolution and overcoming Rayleigh limits.

BACKGROUND ART

An optical imaging system based on a coherence frequency domain reflectometry has become a powerful method of visualizing microstructural optical properties such as absorption, scattering, loss, birefringence, and a spectrum analysis, with a high resolution.

In a conventional optical imaging system, a carrier frequency of a continuous-wave laser beam is repeatedly linearly chirped with time. The linearly chirped laser beam is split into a reference beam and an interrogating beam projected onto an observed object to be recorded.

The interrogating beam reflected from the object is delayed, and thus a finite frequency difference occurs between the interrogating beam and the reference beam. Here, since a magnitude of the finite frequency difference is linearly proportional to a depth location of a cross-section of the object, the depth location of the cross-section of the object can be checked using the magnitude of the finite frequency difference.

For example, if a frequency chirp rate is "S Hz/sec," and the reflected interrogating beam is delayed for time "$\tau$," the reflected interrogating beam and the reference beam interfere with each other in a photodetector and thus form an optical frequency difference "$\delta f = S \times \tau$." Thus, "$\delta f$" is defined as a relative frequency difference between the reference beam and the interrogating beam. Also, a path difference corresponding to the frequency difference, i.e., the depth location "$\Delta z$" of the cross-section of the object, may be determined as "$\Delta z = c \times \delta f / 2S$," wherein "c" denotes a velocity of light in a transmission medium.

Such an existing optical frequency domain reflectometry system detects a photodetector beat note and reads a bit frequency using an electronic spectrum analyzer and/or Fast Fourier Transformation (FFT) that is a high strength operation to detect a distance difference between the observation location and an observed depth location of the cross-section of the object, i.e., the depth location "$\Delta z$" and the reflectivities of the object.

For this purpose, the object is laterally scanned by the interrogating beam, and the depth location and the reflectivities are recoded according to each lateral scan position in order to obtain 3-dimensional image information of the object.

An optical coherence frequency domain reflectometry encodes information about a depth location and reflectivity of an object to be recorded in an optical frequency difference domain and thus does not require a high-speed electronic device that is used for a direct detection based on an optical range system. Also, according to the optical coherence frequency domain reflectometry, moving portions do not ideally exist, and thus a high-speed image can be potentially formed.

In the optical coherence frequency domain reflectometry, a depth resolution is determined by a photodetector used for measuring an optical beat note frequency and a chirp rate of a laser beam.

However, when spatial information of an object to be recorded is extracted, a conventional optical imaging system must collimate a focus of an interrogating beam using an objective lens to obtain a high lateral resolution. The depth range of an object to be recorded must be within a focus area of the interrogating beam having passed the objective lens, i.e, a Rayleigh range.

A spot size determines the lateral resolution and is proportional to a size of the focus area of the interrogating beam. In other words, the spot size of the interrogating beam and the focus area are determined as general Rayleigh limits. Here, the spot size "$\Delta r$" is "$\Delta r = \lambda/2 \sin(a/f)$," the focus area "$Z_R$" is "$Z_R = \lambda/\sin^2(a/f)$," "$\lambda$" is a wavelength of a beam, "a" is a radius of the beam, and "f" is a focal length of the objective lens.

Accordingly, if the focus area "$Z_R$" is increased, the lateral resolution is deteriorated. If the lateral resolution is increased, the focus area is shortened. For example, since a 3-dimensional microscope using a coherence frequency domain reflectometry requires a high resolution, a focus area is seriously limited. Thus, the time for scanning an object to be recorded is lengthened.

There is required a method of overcoming limits of such a conventional technique, obtaining a high lateral resolution in a long depth area, expanding a spot size, and increasing a focus area.

DISCLOSURE OF INVENTION

Technical Problem

The present invention provides an optical imaging system based on a coherence frequency domain reflectometry, for obtaining a high lateral resolution in a long depth area, expanding a spot size, and increasing a focus area.

ADVANTAGEOUS EFFECTS

As described above, in an optical imaging system based on a coherence frequency domain reflectometry according to the present invention, a lateral resolution can be improved. Also, Rayleigh limits can be overcome.

DESCRIPTION OF DRAWINGS

FIG. 1 illustrates an optical imaging system based on a coherence frequency domain reflectometry and a Michelson interferometer according to an embodiment of the present invention.

FIGS. 2(a) and 2(b) illustrate reflective structures for scanning an object to be recorded, according to embodiments of the present invention.

FIG. 3 illustrates an optical imaging system based on a coherence frequency domain reflectometry and a Michelson interferometer according to another embodiment of the present invention, wherein the optical imaging system improves a lateral resolution twice as much as a lateral resolution of the optical imaging system of FIG. 1.

FIG. 4 illustrates an optical imaging system based on a coherence frequency domain reflectometry and a MachZehnder interferometer according to an embodiment of the present invention.

FIG. 5 illustrates an optical imaging system based on a coherence frequency domain reflectometry and an in-line interferometer according to an embodiment of the present invention.

FIG. 6 illustrates an optical imaging system based on a coherence frequency domain reflectometry and a Michelson interferometer according to another embodiment of the present invention.

FIG. 7 illustrates an optical imaging system based on a coherence frequency domain reflectometry and an in-line interferometer according to another embodiment of the present invention.

FIG. 8 illustrates an optical imaging system based on a coherence frequency domain reflectometry, including relay systems, according to an embodiment of the present invention.

BEST MODE

According to an aspect of the present invention, there is provided an optical imaging system based on a coherence frequency domain reflectometry, including: a light source generating an electromagnetic wave; a splitting unit splitting the electromagnetic wave into first and second beams; a reflecting unit reflecting the first beam and re-transmitting the reflected first beam to the splitting unit; an objective lens projecting the second beam onto an object to be recorded; a photodetector transforming an interference pattern into a current signal, wherein the first beam reflected from the reflecting unit interferes with the second beam reflected from the object to generate the interference pattern; and an electronic processing unit processing the current signal to generate an image of the object from the interference pattern.

The light source may be a laser generator that outputs an electromagnetic wave having a chirped frequency.

The splitting unit may be a beam splitter that reflects a portion of the electromagnetic wave to form a reference beam that is the first beam and transmits a portion of the electromagnetic wave to form an interrogating beam that is the second beam.

The interrogating beam reflected from the object may interfere with the reference beam reflected from the reflecting unit by the beam splitter to generate an interference signal.

The photodetector may be a photodiode that generates a current signal corresponding to a pattern intensity of the interference signal between the interrogating beam and the reference beam.

The optical imaging system may further include a light integrator that is disposed between the beam splitter and the photodetector and spatially integrates the reference beam and the interrogating beam having passed the beam splitter.

The optical imaging system may further include a collimator that transforms the electromagnetic wave output from the light source into parallel light and transmits the parallel light to the splitting unit.

The reflecting unit may be a reflector or a concave reflector.

The reference beam reflected from the reflector may be parallel light.

The optical imaging system may further include a reference beam lens that is disposed between the beam splitter and the reflecting unit to transform the reference beam guided to the reflector into a spherical wave.

The concave reflector may reflect the reference beam reflected from the beam splitter to transform the reference beam into the spherical wave.

If the reflecting unit is the reflector, the objective lens may be disposed between the beam splitter and the object to be recorded.

If the reflecting unit is the concave reflector, the objective lens may be disposed between the light source and the beam splitter.

The electronic processing unit may include: an analog-to-digital converter (ADC) sampling the current signal output from the photodetector to transform the current signal into a digital signal; and a signal processor processing one of a signal provided from the ADC and a signal stored in a storage to restore an image of the object.

The current signal may include an encoded pattern that is formed by encoding a cross-sectional image of the object and a Fresnel zone pattern having a limited size.

The signal processor may convolute the encoded pattern with a complex conjugate of the Fresnel zone pattern to restore the cross-sectional image of the object.

The electronic processing unit may further include: an object stage controller generating a control signal for changing a position of an object stage on which the object is placed whenever the signal processor completes processes about an arbitrary position of the object or the storage completely stores a signal about the arbitrary position of the object; and a display displaying an image of the object processed by the signal processor.

The electronic processing unit may further include: a reflective plate controller generating a control signal for changing a position of a reflective plate that is adjacent to the objective lens whenever the signal processor completes processes about an arbitrary position of the object or the storage completely stores a signal about the arbitrary position of the object; and a display displaying an image of the object processed by the signal processor.

A relay system may be installed on at least one side of a path of the electromagnetic wave output from the light source to transmit the electromagnetic wave.

The relay system may be installed on at least one side between the beam splitter and the reference beam lens, between the beam splitter and the light integrator, or between the beam splitter and the objective lens.

The relay system may be formed of at least one of a lens, a prism, a mirror, and an image guiding element that is able to transmit one of an image and a signal.

The optical imaging system may further include an object stage on which the object is placed.

The optical imaging system may further include first and second reflective plates that are disposed between the objective lens and the object stage with an inclination to form an angle with an optical axis of the objective lens and adjust each angle to change a projection position of the interrogating beam.

The optical imaging system may further include first and second reflective plates that are disposed between the beam splitter and the objective lens with an inclination to form an angle with an optical axis of the objective lens and adjust each angle to change a projection position of the interrogating beam.

The optical imaging system may further include an auxiliary interferometer that corrects non-linearity of the electromagnetic wave output from the light source.

The auxiliary interferometer may include: a first optical coupler splitting a portion of the electromagnetic wave output from the light source; a second optical coupler splitting a laser beam transmitted from the first optical coupler; and a photodetector transforming the electromagnetic wave output from the second optical coupler into a current signal to generate an auxiliary interference signal.

The ADC may sample the auxiliary interference signal output from the photodetector unit and the interference signal output from the photodetector.

The signal processor may form a new time axis for correcting frequency sweeping using the auxiliary interference signal sampled by the ADC.

The optical imaging system may further include a power calibration unit that relieves a fluctuation of an intensity of the electromagnetic wave during frequency sweeping of the electromagnetic wave.

The power calibration unit may include: a third optical coupler splitting a laser beam output from the light source; a power detector measuring an output intensity of the laser beam; and a differential amplifier outputting a difference between the current signal output from the photodetector and the output intensity of the laser beam measured by the power detector.

An output of the power detector may be transmitted to the light source to calibrate the intensity of the electromagnetic wave.

The ADC may sample the difference output from the differential amplifier, and the signal processor may reflect the difference sampled by the ADC to process the current signal provided from the photodetector.

A line transforming unit may be disposed on one of paths of the reference beam, the interrogating beam, and the interference signal to transform the electromagnetic wave into a line form.

The line transforming unit may be an optical element, a slit, or a cylinder lens.

According another aspect of the present invention, there is provided an optical imaging system based on a coherence frequency domain reflectometery, including: a light source generating an electromagnetic wave; an objective lens transforming the electromagnetic wave into a spherical wave; a reflecting unit reflecting a portion of the electromagnetic wave to form a first beam and transmitting a portion of the electromagnetic wave to form a second beam; an interfering unit interfering the first beam reflected from the reflecting unit with the second beam reflected from an object to be recorded to generate an interference signal; a photodetector transforming the interference signal into a current signal; and an electronic processing unit processing the current signal to generate an image of the object from the interference signal.

According another aspect of the present invention, there is provided an optical imaging system based on a coherence frequency domain reflectometery, including: a light source generating an electromagnetic wave; an optical coupler splitting the electromagnetic wave into plurality of electromagnetic waves; first and second collimators receiving the electromagnetic waves split by the optical coupler, separating the electromagnetic waves into first and second beams, transforming the first and second beams into parallel light; a reference beam lens transforming the first beam into a spherical wave; an objective lens transforming the second beam into a spherical wave and projecting the spherical wave onto an object to be recorded; an interfering unit interfering the first and second beams with each other to generate an interference signal; a photodetector transforming the interference signal into a current signal; and an electronic processing unit processing the current signal to generate an image of the object from the interference signal.

MODE FOR INVENTION

The present invention will now be described in detail with reference to the attached drawings.

An optical imaging system based on a coherence frequency domain reflectometery according to the present invention uses a Fresnel zone pattern encoding method for a cross-sectional image of an object to be recorded in order to overcome limits of a conventional coherence frequency domain reflectometery.

FIG. 1 illustrates an optical imaging system based on a coherence frequency domain reflectometery according to an embodiment of the present invention.

The optical imaging system of the present embodiment is based on a Michelson interferometer in which a beam splitter 20 is positioned before an objective lens 25. The optical imaging system includes an optical system 1, an auxiliary interferometer 100, and a power calibration unit 120.

The optical system 1 includes a light source 10, a collimator 15, the beam splitter 20, a reflector 30, the objective lens 25, an object stage 35, a light integrator 40, a photodetector 45, and an electronic processing unit 50.

The light source 10 generates an electromagnetic wave necessary for extracting a cross-sectional image of an object and a laser generator 10 that generates a laser beam may refer to the light source as an example of the light source for convenience of describing the present invention hereinafter. Various types of light sources using techniques well known in the art may be used.

The laser generator 10 includes a laser source or the laser source and a dispersive element to generate a continuous or pulse type laser beam having a chirped frequency. In general, a depth resolution and an image obtaining time of an optical coherence tomography system are determined by the photodetector 45 and a chirp rate of a laser beam. Also, a wide optical spectrum must be scanned at short time intervals to improve a frequency chirp rate of the laser beam.

A normal technique for chirping a laser frequency includes an acousto-optical frequency shifter and a tunable laser. However, the tunable laser requires a long scanning time (about 0.1 ms), and a bandwidth of the acousto-optical frequency shifter is seriously limited. Thus, an excellent frequency chirp rate cannot be obtained using the acousto-optical frequency shifter and the tunable laser.

Therefore, in order to obtain an excellent chirp rate, the laser generator 10 may have a ring laser structure to connect a filter such as a tunable Fabry-Perot filter to a gain medium such as an erbium-doped fiber amplifier or a semiconductor optical amplifier having a wide wavelength area through an optical fiber. Also, the laser generator 10 may continuously change a selection frequency of the filter at predetermined time intervals to rapidly chirp a laser frequency output through an optical fiber output coupler. Here, the tunable Fabry-Perot filter is driven by a piezoelectric driver and can rapidly tune a selection wavelength.

As described above, the present embodiment uses the laser generator 10 having the ring laser structure as the laser source. However, the laser generator 10 may be a laser generator that positions a dispersive medium inside or outside a laser resonator and continuously changes dispersion characteristics of the dispersive medium within a short time at predetermined time intervals using a high-speed galvano scanner or the like in order to rapidly chirp a laser frequency. For example, a facet of a semiconductor amplifier medium having a wide wavelength area functions as an end mirror of an external cavity, and a diffraction grating attached to the high-speed galvano scanner is positioned on a beam path of the external cavity. Also, a slit for selecting a wavelength is positioned on a beam path that is spatially split according to wavelength by the diffraction grating as the dispersive medium. In addition, the end mirror of the external cavity is adjacent to the slit.

Here, if the diffraction grating is continuously rotated by the high-speed galvano scanner at predetermined time intervals, a wavelength selected with time may be continuously changed. Thus, the laser generator may rapidly chirp a laser frequency output emitted through the facet of the semiconductor amplifier medium.

Alternatively, a laser generator using a pulse laser as a laser source may be used. Here, the pulse laser may have a wide spectrum width and may be easily obtained at every time interval shorter than 1 ns so as to improve a depth resolution.

Also, a frequency of the pulse laser is chirped using an optical fiber or a grating pair as a dispersion unit. The dispersion unit chirps the frequency of the pulse laser using a dispersion mechanism such as stretching of the optical fiber, dispersing of the grating pair, or a direct modulation of a bias current in order to emit a frequency chirped electromagnetic wave. Here, dispersion unit allows different spectrum elements of the pulse laser to appear at different times in order to linearly chirp a laser frequency.

For example, a laser frequency chirp rate as high as $10^{21}$ Hz/s may be achieved by propagating the laser pulses each having a width of 2 ps and being emitted by Ti:Saphhire laser and through a single mode optical fiber having a length of 2 km stretches. Also, a pulse width of the pulse laser expands to 600 ps at an output of the optical fiber through an interaction between self-phase modulation and dispersion.

An electric field of a laser beam emitted from the laser generator 10 is expressed as in Equation 1 below:

$$E_o(t) \approx A(t)\exp(j(\overline{\omega}_o t+\phi(t))) \quad (1)$$

wherein "$A(t)$" denotes an amplitude of the electric field, "$\overline{\omega}_o$" denotes a nominal center frequency, "t" denotes time, and "$\phi(t)$" denotes a phase of the electric field, i.e, frequency chirping that is repeated with time. "$A(t)$" may be set to a constant, and a fluctuation of a laser may be corrected by monitoring an output of the laser.

The collimator 15 transforms the laser beam repeatedly chirped by the laser generator 10 with time into parallel light and provides the parallel light to the beam splitter 20.

The beam splitter 20 splits the parallel light output from the collimator 15 into a reference beam and an interrogating beam. The beam splitter 20 reflects a portion of the input parallel light to form the reference beam and passes a portion of the input parallel light to form the interrogating beam. Here, the reference beam is provided to the reflector 30, and the interrogating beam is provided to the object to be recorded through the objective lens 25.

The objective lens 25 is disposed parallel with the collimator 15 and concentrates the interrogating beam that has passed the beam splitter 20. Here, a spatial distribution of the interrogating beam having passed the objective lens 25 becomes a spherical wave. Thus, the interrogating beam having passed the objective lens 25 forms a focal point in front of the object stage 35 on which the object is placed.

The interrogating beam that has passed the objective lens 25 and has become the spherical wave can be expressed as in Equation 2 below:

$$E_s(\vec{r}_s,z_s,t) \approx \exp[-i\pi \vec{r}_s^2/\lambda(z_0+z_s)]\mathrm{circ}[\vec{r}_s/\sin \alpha(z_o+z_s)] \exp(j(\overline{\omega}_o t+\phi(t))) \quad (2)$$

wherein "$z_o$" denotes a focal length of the objective lens 25, "$\alpha$" denotes a half corn angle, and "$(\vec{r}_s,z_s)$" denotes horizontal and axial coordinates systems of a space of the object. Here, the origin of the horizontal coordinates system is a central axis of the objective lens 25, and the origin of the axial coordinates system is at the focal length "$z_o$" from a front focal point 37 of the objective lens 25. "$\lambda$" is a wavelength of a beam that is changed with frequency chirping and thus has a wavelength width corresponding to a frequency chirping width. Here, circ(x)=1 for x≦1 and circ(x)=0 in other areas. Also, a numerical aperture of the interrogating beam is "sin $\alpha=a/z_o$," wherein "a" denotes a radius of the parallel light transformed by the collimator 15.

If the objective lens 25 is disposed in an appropriate position on a path of the laser beam irradiated from the laser generator 10, the spherical wave may be formed without the collimator 15.

The interrogating beam having passed the objective lens 25 scans the object to be recorded. Here, the interrogating beam laterally scans the object that is placed on the object stage 35 and has a reflection coefficient of "$R_o(\vec{r}_s,z_s)=|R_o(\vec{r}_s,z_s)|\exp(i\theta(\vec{r}_s,z_s))$."

The interrogating beam reflected from the object is given as "$E_s(\vec{r}_s,z_s)R_o(\vec{r}_s-\vec{r}_t,z_s)$", passes the objective lens 25, is reflected from the beam splitter 20, and is formed as an image on an imaging plane 38. Here, "$\vec{r}_t$" is an instantaneous translated location of the object stage 35 according to time. Also, the imaging plane 38 is a virtual plane on which an image of the object is formed and marked with dotted lines between the light integrator 40 and the beam splitter 20 for convenience of describing the present invention. However, the imaging plane 38 may be disposed before or after the light integrator 40 or in a position of the light integrator 40 according to a structure of an optical system that forms the image. Here, the interrogating beam can be expressed as in Equation 3 below:

$$E_1(\vec{r},z,t+\Delta t_1) \approx R_o(\vec{r}-\vec{r}_t,z)\exp[-i\pi \vec{r}^2/\lambda(z_o+z)]\mathrm{circ}[\vec{r}/\sin \alpha(z_o+z)] \times \exp(j(\overline{\omega}_o t+\overline{\omega}_o \Delta t_1+\phi(t+\Delta t_1))) \quad (3)$$

wherein "$(\vec{r},z)$" denotes horizontal and axial coordinates systems of the imaging plane 38. Here, the origin of the horizontal coordinates system is a central axis of the objective lens 25, the origin of the axial coordinates system is at the focal length "$z_o$" from a back focal point 36 of the objective lens 25, and "$\Delta t_1$" is a flight time of light from a cross-section of the object to the imaging plane 38.

The object stage 35 is a plate on which the object to be recorded is placed and is laterally moved so that the interrogating beam laterally scans the object.

In case that the object stage 35 is moved, an additional driver is provided to drive the object stage 35. Here, the additional driver operates according to a control signal output from an object stage controller 80 of the electronic processing unit 50 to move the object stage 35.

Instead of moving the object stage 35, the object stage 35 may be fixed and a reflective structure may be provided in front of or in the rear of the objective lens 25 to refract the interrogating beam.

As shown in FIG. 2(a), a pair of reflectors 90 may be used as reflective structures. The reflectors 90 may be disposed parallel with each other at a predetermined distance according to a surface direction of the objective lens 25. Also, rotation angles of the reflectors 90 may be controlled to move the interrogating beam across the object so that the interrogating beam scans the object. As shown in FIG. 2(b), a pair of reflectors 95 may be used as reflective structures. The reflectors 95 may be disposed in front of the objective lens 25 to change a projection position of the interrogating beam. In case that the reflectors 90 or 95 are moved, an additional driver may be provided to drive the reflectors 90 or 95 and may operate according to a control signal output from a reflector controller (not shown) provided in the electronic processing unit 50.

Besides the above-described methods, the object may be scanned using various methods of moving a lens, using an electro-optic deflector, etc. The scanning of the interrogating beam described in FIGS. 2(a) and 2(b) is based on 2-dimensional scanning. However, the interrogating beam may be refracted only in one direction to obtain a 1-dimensional image and then restored using 1-dimensional decoding so as to obtain a 2-dimensional cross-sectional image that is a depth image according to a 1-dimensional line.

If a depth range of the object to be recorded is shorter than a coherence length of the laser beam having the chirped frequency, the object stage 35 is not needed to be moved in a vertical axis direction. However, if the depth range of the object is longer than the coherence length of the laser beam, a 3-dimensional image of the object is needed to be scanned in a series of vertical axial zones to extract 3-dimensional image information of the object in a total depth range of the object. In this case, the object stage 35 may be moved in the vertical axis direction of the object to scan the 3-dimensional image of the object in the series of vertical axial zones. Thus, a 3-dimensional image may be obtained in a total depth area of the object longer than the coherence length of the laser beam.

The reflector 30 is positioned on a path of the reference beam to reflect the reference beam and then provide the reflected reference beam to the beam splitter 20. The beam splitter 20 passes the reference beam and provides the reference beam to the light integrator 40. Here, the reference beam is the parallel light that has been transformed by the collimator 15.

The reference beam reaches the imaging plane 38 and can be expressed as in Equation 4 below:

$$E_2(\vec{r}, t+\Delta t_2) \approx \text{circ}[\vec{r}/a] \exp(j(\overline{\omega}_o t + \overline{\omega}_o \Delta t_2 + \phi(t+\Delta t_2))) \quad (4)$$

wherein "$\Delta t_2$" denotes a flight time of the reference beam from the reflector 30 to the imaging plane 38. The reference beam is a plane wave having limited size. Here, a lens may be positioned on the path of the reference beam of the laser beam irradiated from the laser generator 10 without using the collimator 15 to form the plane wave.

The interrogating beam and the reference beam having reached the imaging plane 38 interfere with each other on the imaging plane 38, and a spatial distribution of the reference beam that is the parallel light interferes with a spatial distribution of the interrogating beam that is the spherical wave, in order to form an interference signal.

The light integrator 40 spatially integrates the interference signal. Here, the light integrator 40 may be realized using a lens (or lenses). Besides the lens (or lenses), the light integrator 40 may be realized using various light integrating methods well known in the art such as an imaging or non-imaging light integrator including a concave mirror, etc.

The photodetector 45 transforms the spatially integrated interference signal into a current signal. Here, the photodetector 45 generates current according to an intensity of a pattern of the spatially integrated interference signal. The photodetector 45 may be realized using a photodiode. However, the present invention is not limited thereto, and thus the photodetector 45 may be realized using a photo-multiplier tube.

The current signal generated by the photodetector 45 can be expressed as in Equation 5 below:

$$I(\vec{r}_p, t) = \int |E_1|^2 + |E_2|^2 + 2Re\{R_o(\vec{r} - \vec{r}_p, z)\} \times \{\int \cos[-\pi \vec{r}^2/\lambda(z_o+z) + \overline{\omega}_o \tau + \phi(t) - \phi(t-\tau)] d\lambda\} \times \text{circ}[\vec{r}/\sin\alpha(z_o+z)] d\vec{r} \quad (5)$$

wherein "Re{ }" denotes an operation of extracting a real number part of a complex number, and "$\tau = \Delta t_1 - \Delta t_2$" denotes a relative flight time difference according to a path difference between the reference beam reflected from the reflector 30 and the interrogating beam reflected from the object to be recorded. Here, "$\tau$" is proportional to a relative distance of the object and thus becomes "$\Delta z \approx c\tau/2n$", wherein "c" is a velocity of light in a vacuum state, and "n" denotes a refraction index on a medium.

The spatial distribution of the interrogating beam is the spherical wave, the spatial distribution of the reference beam is the plane wave, and a carrier frequency of the laser beam is repeatedly chirped with time. Thus, each frequency component of the current signal generated by the photodetector 45 includes information about an encoded pattern including the cross-sectional image of the object in a corresponding depth location and a Fresnel zone pattern.

If a linearly chirped laser beam having a chirped frequency range "$\Delta f$" and a duration time "$T_o$" is used, a phase difference occurs due to a relative flight time difference occurring due to the path difference between the reference beam reflected from the reflector 30 and the interrogating beam reflected from the object and can be expressed as in Equation 6 below:

$$\phi(t) - \phi(t-\tau) = (\Delta f / T_o) \tau t. \quad (6)$$

Using Equation 6 above, the phase difference between the reference beam and the interrogating beam may be obtained. Since the phase difference is proportional to a depth location of the cross-section of the object, the depth location of the cross-section of the object may be checked.

The current signal generated by the photodetector 45 can be expressed as in Equation 7 below:

$$I(\vec{r}_p, t) = \int |E_1|^2 + |E_2|^2 + 2Re\{R_o(\vec{r} - \vec{r}_p, z)\} \times \{\int \cos[-\pi \vec{r}^2/\lambda(z_o+\Delta z) + \overline{\omega}_o \tau + (\Delta f/T_o) \tau t] d\lambda\} \times \text{circ}[\vec{r}/\sin\alpha(z_o+\Delta z)] d\vec{r} \quad (7)$$

The current signal is changed in a sinusoidal waveform of a frequency in each translated position of the object stage 35 with time.

The electronic processing unit 50 processes the current signal detected by the photodetector 45 as a digital signal to extract the 3-dimensional image of the object. The electronic processing unit 50 includes an analog-to-digital converter (ADC) 60, a signal processor 65, a storage 70, the object stage controller 80, and a display 75. The storage 70 stores the 3-dimensional image of the object processed by the signal processor 65. The object stage controller 80 generates a control signal for changing a position of the object stage 35 whenever the signal processor 65 completes the processes for an arbitrary position of the object. The display 75 displays an image processed by the signal processor 65.

The ADC 60 converts the current signal generated by the photodetector 45 into the digital current signal. The converted digital current signal and a scanning position of the object stage 35 are provided to the signal processor 65.

The signal processor 65 removes the Fresnel pattern from the encoded pattern provided from the ADC 60 to restore the cross-sectional image of the object.

The encoded pattern provided to the signal processor 65 is a 1-dimensional array in each translated position of the object stage 35 with time. The signal processor 65 performs normal Fourier analysis such as Fast Fourier Transform (FFT) on a 1-dimensional array signal. Here, other algorithms for obtaining frequency components of a signal, such as maximum entropy or wavelet transformation, may be used.

A frequency component of a signal at $f_b=(\Delta f/T_o)\tau$ obtained by FFT performed in the signal processor 65 can be expressed as in Equation 8 below:

$$O(\vec{r}_t, f_b) = F\{I(\vec{r}_t, t)\}|_{f=f_b} \quad (8)$$

$$= \int R_o(\vec{r}-\vec{r}_t, \Delta z) \left\{ \int \left[ \frac{\exp\left[\frac{-i\pi \vec{r}^2}{\lambda(z_o+\Delta z)}\right]}{\mathrm{circ}\left[\frac{\vec{r}}{\sin\alpha(z_o+\Delta z)}\right]} \right] d\lambda \right\} d\vec{r}$$

$$= R_o(\vec{r}, \Delta z) \otimes \left\{ \int \left[ \frac{\exp\left[\frac{-i\pi \vec{r}^2}{\lambda(z_o+\Delta z)}\right]}{\mathrm{circ}\left[\frac{\vec{r}}{\sin\alpha(z_o+\Delta z)}\right]} \right] d\lambda \right\}$$

wherein "F{ }" denotes Fourier Transform, and "⊗" denotes a convolution operation. The frequency component at each $f_b=(\Delta f/T_o)\tau$ corresponding to the depth location of the object is stored along with the position of the object stage 35.

Also, the electronic processing unit 50 stores the digital current signal of the 1-dimensional array converted by the ADC 60 in the arbitrary position of the object together with the position of the object stage 35 in the storage 70. After scanning is completed, the electronic processing unit 50 reads the digital current signal from the storage 70 and transmits the digital current signal to the signal processor 65 to perform a signal processing procedure as described above. Here, the object stage controller 80 generates the control signal for changing the position of the object stage 35 whenever the digital current signal of the 1-dimensional array converted by the ADC 60 in the arbitrary position of the object is completely stored along with the scanning position in the storage 70. In this case, signal processing is performed after scanning is completed. Thus, scanning can be completed within a short time.

The digital current signal stored in the storage 70 is an encoded pattern that is formed by encoding the cross-sectional image of the object and the Fresnel zone pattern having a limited size and can be expressed as in Equation 9 below:

$$O(\vec{r}_t, f_b) = R_o(\vec{r}, \Delta z) \otimes S(\vec{r}, \Delta z) \quad (9)$$

wherein "$S(\vec{r},\Delta z)=\int\exp[-i\pi\vec{r}^2/\lambda(z_o+\Delta z)]\mathrm{circ}[\vec{r}/\sin\alpha(z_o+\Delta z)]d\lambda$" denotes an interference pattern between a plane wave having limited size and a spherical wave having limited size, i.e., a Fresnel zone pattern of limited size having a Fresnel number "$F=a^2/\lambda z_o$." Thus, "$O(\vec{r}_t,f_b)$" is the encoded pattern of the cross-sectional image "$R_o(\vec{r},\Delta z)$" of the object and the Fresnel zone pattern, i.e., a hologram in the depth location of the cross-sectional image according to Helmholtz-Kirchhoff and Rayleigh-Sommenrfeld diffraction formula. Here, the Fresnel zone pattern has a wavelength width according to frequency sweeping.

The signal processor 65 restores the cross-sectional image "$R_o(\vec{r},\Delta z)$" of the object through a convolution between the encoded pattern "$O(\vec{r}_t,f_b)$" and a complex conjugate of the Fresnel zone pattern. Here, the complex conjugate of the Fresnel zone pattern is a field function, and the complex conjugate of the Fresnel zone pattern corresponding to the depth location of the object that has been recorded is convoluted with the encoded pattern. Here, the complex conjugate of the Fresnel zone pattern in location "$z=\Delta z$" is "F($\vec{r},\Delta z)=S^*(\vec{r}_t,\Delta z)$." An image restored through a convolution with the complex conjugate of the Fresnel zone pattern can be expressed as in Equation 10 below:

$$R_{Re}(\vec{r},\Delta z) \approx O(\vec{r}_t,f_b) \otimes F(\vec{r},\Delta z) = O(\vec{r}_t,f_b) \otimes S^*(\vec{r}_t,\Delta z) \quad (10)$$

This restoration corresponds to a digital back propagation and is known as Fresnel transform. Also, the restoration of the encoded pattern may be realized using various digital back propagations including a Fresnel analysis, a wavelet analysis, a holographic element (Hogel), Multi-step Fresnel Propagation, FFT based on an angular spectrum, direct integration, and inverse scattering, and various algorithms of digital holography.

A restoration algorithm described above can be deciphered in the Fourier domain as in Equation 11 below:

$$\tilde{R}_{Re}(\vec{v},\Delta z) \approx \tilde{O}(\vec{v},f_b)\tilde{F}^*(\vec{v},\Delta z) \quad (11)$$

wherein "$\vec{v}$" denotes a spatial frequency, and "$\tilde{R}_{Re}(\vec{v},\Delta z)$, $\tilde{O}(\vec{v},f_b)$, and $\tilde{F}^*(\vec{v},\Delta z)$" are respectively 2-dimensional Fourier Transform of "$R_{Re}(\vec{r},\Delta z)$, $O(\vec{r}_t,f_b)$, and $F^*(\vec{r}_t,\Delta z)$".

The restoration of the cross-sectional image of the object is processed by the signal processor 65 and is achieved by decoding the encoded pattern using the Fresnel zone pattern. Thus, the depth area of the object depends on a coherence length of a laser emission not a Rayleigh area of the objective lens 25. Therefore, an image having a high lateral resolution is obtained in the depth area of the object corresponding to the coherence length of the laser, i.e., the total depth area of the object.

A 3-dimensional point spread function (PSF) of the image restored by the signal processor 65 can be expressed as in Equation 12 below:

$$h(\vec{r},\delta z) \approx S(\vec{r}_t,0) \otimes S^*(\vec{r},\delta z) \quad (12)$$

wherein "$\delta z$" denotes a depth difference between the Fresnel zone pattern used for encoding the cross-sectional image and the Fresnel zone pattern used for restoring the cross-sectional image.

A transfer function of the optical imaging system based on the coherence frequency domain reflectometry is obtained through 2-dimensional Fourier Transform of a PSF and thus can be expressed as in Equation 13 below:

$$H(\vec{v},\delta z) \approx \exp(-i\pi\lambda\vec{v}^2\delta z)\mathrm{circ}(\lambda\vec{v}/\sin\alpha) \quad (13)$$

The transfer function describes how the spatial frequency "$\vec{v}$" of the restored image of the object that is defocused by the depth difference "$\delta z$" appears on the imaging plane 38.

The transfer function shows two characteristics as follows.

First, a cut-off frequency of the restored image is "$v_{max}=\sin\alpha/\lambda$" and equal to a cut-off frequency of the objective lens 25. Thus, a lateral resolution of the restored image is "$\Delta r=\lambda/2\sin\alpha$" and equal to a lateral resolution of an existing wide field image and corresponds to a Rayleigh limit of the objective lens 25. The second characteristic relates to a defocusing characteristic of a spatial frequency. Since a spatial frequency varying with a defocus "$\delta z$" causes different phase shifts, a defocused image is generated.

Accordingly, if a Fresnel zone pattern corresponding to a Fresnel zone pattern used in the encoding step is used in the restoration step, a focused cross-sectional image is restored.

In the restoration step, an in-focus range is defined by an axial distance difference that changes the Fresnel number of a decoding pattern by one unit from the value of a Fresnel number at a focus. Thus, the in-focus range is "$\delta z=\lambda/\sin^2\alpha$" and equal to an in-focus range of a wide field imaging system and corresponds to a Rayleigh range of the objective lens 25. In general, the frequency of the laser beam chirped by the laser generator 10 is non-linearly swept by high rate frequency sweeping. When high-speed frequency sweeping operates, a frequency of a laser varies sinusoidally rather than linearly with time.

The auxiliary interferometer 100 is used to correct the laser beam so that the laser beam is in an equally spaced interval along the frequency.

The auxiliary interferometer 100 includes first and second optical couplers 105 and 110 and a photodetector unit 115 and generates an auxiliary interference signal to correct non-linearity of the laser beam emitted from the laser generator 10.

The first optical coupler 105 splits a portion from the laser beam emitted from the laser generator 10, provides the split laser beam portion to the second optical coupler 110, splits a portion of about 10% from the laser beam emitted from the laser generator 10 and provides the 10% laser beam portion to the second optical coupler 110.

The second optical coupler 110 splits the laser beam transmitted from the first optical coupler 105 and provides the split laser beam to the photodetector unit 115. Here, the second optical coupler 110 splits the laser beam on a 50-to-50 basis.

The photodetector unit 115 transforms the laser beam transmitted from the second optical coupler 110 into a current signal to generate the auxiliary interference signal and provides the auxiliary interference signal to the signal processor 65 through the ADC 60.

The auxiliary interference signal generated by the photodetector unit 115 of the auxiliary interferometer 100 is provided to the ADC 60, and the ADC 60 receives the auxiliary interference signal from the auxiliary interferometer 100 and the interference signal from the photodetector 45 in parallel using two channels. The ADC 60 samples the auxiliary interference signal to transform the auxiliary interference signal into a digital signal.

A filter having a pass band corresponding to a frequency range of the auxiliary interference signal may be installed before or after the ADC 60 in order to remove noise from the auxiliary interference signal and obtain a clear sinusoidal wave.

If the signal processor 65 checks an accurate form of frequency sweeping using the auxiliary interference signal, a time axis of sample data is changed in order to indicate a bit signal characteristic of linear sweeping on a time axis, wherein the sample data is sampled from the interference signal transmitted from the photodetector 45. If the time axis is changed into a new time axis, the signal processor 65 processes data as follows.

The signal processor 65 interpolates new time samples into a new time axis coordinates with equal time increments based on linear or non-linear fit of actual data values in the new time axis. Such corrected samples have linear sinusoidal frequencies. Also, the signal processor 65 performs standard Fourier analyses such as FFT in order to obtain depth information of the encoded cross-sectional image of the object. Here, other algorithms such as maximum entropy, wavelet transform, etc. may be used.

As an example of a detailed method of changing the time axis of the sample data sampled from the interference signal transmitted from the photodetector 45 to indicate the bit signal characteristic of linear sweeping on the time axis using the auxiliary interference signal, the signal processor 65 performs streaming processing to inspect values before and after all sampling points of time of the auxiliary interference signal using a high-speed nearest neighbor check algorithm. Here, if two values before and after a sampling point of time are higher or lower than a value at the sampling point of time, the signal processor 65 stores sample data sampled from the interference signal of the photodetector 45 at the sampling point of time. If stored sample data is sequentially arranged, frequencies of the sequentially arranged sample data are corrected on a new time axis of the sequentially arranged sample data, and thus the sequentially arranged sample data has linear sinusoidal frequencies.

In general, a frequency is periodically swept and has a portion in which the frequency maps with time, and the mapping portion may be divided into monotonically increasing and decreasing portions. Here, a windowing function may be executed to remove low reliable data at a transition point at which "f(t)" is changed from an increase into a decrease or from a decrease into an increase.

The above-described methods are to correct non-linear frequency sweeping using a real-time or a prior knowledge of a source frequency sweep profile and uniform or non-uniform samples according to non-linear signal processing techniques.

Here, the knowledge of a form of frequency sweeping may be found out from an input of a laser if an operation of a laser beam is well known. For example, in a case of a semiconductor laser in which a frequency modulation response to an input current of a laser is known, an output of a laser frequency is extracted from an input of the laser.

If the operation of the laser is complicated, the knowledge of a form of laser frequency sweeping may be found out using optical calibration techniques. For example, there is a method of measuring a relative time of a frequency chirp laser that has passed through a filter using a calibrated narrowband optical filter (e.g., calibrated using a wavelength measurer) and time gating techniques. Here, the calibrated narrowband optical filter may be changed step by step in a frequency sweeping area to map frequency sweeping. As a similar method to this, gating may be executed using a laser having a known frequency (using a wavelength measurer) and a heterodyne method.

Also, various types of optical delay lines, optical frequency discriminators (e.g., etalons), Fabry-Perot, unbalanced MachZehnder, and Michelson interferometers) are used to obtain the knowledge of frequency sweeping.

According to another aspect of the present invention, in order to correct non-linear frequency sweeping, a path difference of the auxiliary interferometer 100 may be changed, and the auxiliary interference signal of the photodetector unit 115 of the auxiliary interferometer 100 may be recorded according to the path difference. The recorded auxiliary interference signal is used as a basis of wavelet transform for extracting a non-linear frequency component or directly used to detect heterodyne. The auxiliary interference signal output from the photodetector unit 115 may be multiplied by the interference signal output from the photodetector 45 and then low-pass filtering may be performed so as to detect heterodyne in real time.

The power calibration unit 120 is used to relieve an intensity fluctuation effect of a laser during frequency sweeping of the laser and includes a third optical coupler 125, a power detector 130, and a differential amplifier 135.

The third optical coupler 125 splits the laser beam generated by the laser generator 10 and provides the split laser beam to the power detector 130. Here, the third optical coupler 125 provides about 10% of the laser beam to the power detector 130.

The power detector 130 may be a photodiode and may measure an output intensity of the laser beam to measure a fluctuation in the output intensity of the laser beam. The measured output intensity is used to calibrate an output of the laser beam or regularize a signal output from the photodetector 45.

The differential amplifier 135 outputs an output intensity difference between an output signal of the photodetector 45 including spatial information of the object to be recorded and an output intensity of the laser beam. Here, as known in the art of the present invention, a balanced amplified photodetector may be used to function as the photodetector 45, the power detector 130, and the differential amplifier 135.

An output of the power detector 130 may be applied to the laser generator 10 to calibrate the intensity of the laser beam or may be used after being sampled by the ADC 60, to regularize the current signal that is the output from the photodetector 45 in the electronic processing unit 50.

As a method of providing the laser beam to the auxiliary interferometer 100 and the power calibration unit 120, besides a method of splitting and providing a portion from the laser beam generated by the laser generator 10 using an optical coupler, in the cases of the embodiment illustrated with reference to FIG. 1, and embodiments that will be described later with reference to FIGS. 3 and 6, partial reflectors having partial reflectivity may be used as reflectors 30, 230, and 530 to transmit a portion of the reference beam behind the reflectors 30, 230, and 530. Next, the transmitted beam may be coupled to an optical fiber and then provided to the auxiliary interferometer 100 and the power calibration unit 120. In the cases of embodiments that will be described later with reference to FIGS. 5 and 7, a portion of a laser beam vertically reflected from beam splitters 420 and 620 is coupled to an optical fiber and then provided to the auxiliary interferometer 100 and the power calibration unit 120, wherein the laser beam is provided from collimators 415 and 615 to the beam splitters 420 and 620. As described above, a beam is provided to the auxiliary interferometer 100 and the power calibration unit 120 using an optical fiber coupler and in addition, the beam passed through the partial reflectors or reflected from the beam splitters 420 and 620 may be concentrated by a lens or may be split by a beam splitter and then directly applied to the auxiliary interferometer 100 or the power calibration unit 120 as well FIG. 3 illustrates an optical imaging system based on a coherence frequency domain reflectometry according to another embodiment of the present invention.

The optical imaging system of the present embodiment is based on a Michelson interferometer and improves a lateral resolution twice as much as the lateral resolution of the optical imaging system of the previous embodiment.

Like the optical imaging system of the previous embodiment, the optical imaging system of the present embodiment may include the auxiliary interferometer 100, the power calibration unit 120, and reflective structures for refracting an interrogating beam as illustrated in FIG. 2(a) or 2(b).

The descriptions and illustrations of the auxiliary interferometer 100, the power calibration unit 120, and the reflective structures of the present embodiment are repeated with those illustrated in FIG. 1. Therefore, they will be omitted in the present embodiment for convenience of describing the present embodiment. Only an optical system 201 of the optical imaging system will be illustrated and described.

The optical system 201 of the present embodiment includes a laser generator 210, a collimator 215, a beam splitter 220, a reference beam lens 227, a reflector 230, an objective lens 225, an object stage 235, a light integrator 240, a photodetector 245, and an electronic processing unit 250. Compared to the optical system 1 of the previous embodiment, only the reference beam lens 227 is additionally installed in the optical system 201.

The laser generator 210 generates a laser beam having a carrier frequency that is repeatedly linearly chirped with time.

The collimator 215 transforms the laser beam into parallel light, and the beam splitter 220 splits the laser beam into a reference beam and an interrogating beam.

The interrogating beam passes the objective lens 225, is transformed into a spherical wave irradiating an object to be recorded, and scans the object placed on the object stage 235 through lateral scanning of the object stage 235.

As in the previous embodiment, the objective lens 225 may be appropriately positioned on a path of the laser beam to generate the spherical wave without using the collimator 215.

The interrogating beam reflected from the object passes through the beam splitter and is formed as an image on an imaging plane 238 of the objective lens 225 by the objective lens 225.

Here, the imaging plane 238 is a virtual plane on which the image of the object is formed and which is marked with dotted line between the light integrator 240 and the beam splitter 220 for convenience of describing the present invention. However, the imaging plane 238 may be formed before or after the light integrator 240 or in a position of the light integrator 240 according to a structure of the optical system 201 that forms the image.

The reference beam passes the reference beam lens 227 to be transformed into a spherical wave and then reflected from the reflector 230. The reference beam lens 227 focuses the reflected reference beam in position "$z_o$" from the imaging plane 238. The reflected reference beam can be expressed as in Equation 14 below:

$$E_2(\vec{r}, z, t+\Delta t_2) \propto \exp[i\pi \vec{r}^2/\lambda(z_o-z)]\text{circ}[\vec{r}/\sin \alpha(z_o+z)] \times \exp(j(\overline{\omega}_o t + \overline{\omega}_o \Delta t_2 + \phi(t+\Delta t_2))) \quad (14)$$

wherein "$\Delta t_2$" denotes a flight time of light from the reflector 230 to the imaging plane 238 of the objective lens 225. Here, as the reference beam is transformed into the spherical wave, a Fresnel zone pattern formed on the imaging plane 238 has a two times more Fresnel number than the Fresnel zone pattern of the previous embodiment.

The reference beam lens 227 may be appropriately positioned on a path of the reference beam of the laser beam to transform the reference beam into the spherical wave without using the collimator 215. Also, a concave or convex reflector may be used on the path of the reference beam or a lens may be combined with a mirror and then positioned on the path of the reference beam to transform the reference beam into the spherical wave.

The interrogating beam reflected from the object and the reference beam reflected from the reflector 230 interferes with each other on the imaging plane 238 of the objective lens 225 to generate an interference signal. The interference signal is spatially integrated by the light integrator 240, and the photodetector 245 generates a current signal according to an intensity of the spatially integrated interference signal. The current signal can be expressed as in Equation 15 below:

$$I(\vec{r}_p,t) = \int [|E_1|^2 + |E_2|^2 + 2Re\{R_o(\vec{r}-\vec{r}_p,z)\} \times \{\int \cos[-\pi \vec{r}^2 2z_o/\lambda(z_o^2+z^2) + \overline{\omega}_o \tau + \phi(t) - \phi(t-\tau)]d\lambda\} \times \text{circ}[\vec{r}/z_o \sin \alpha]d\vec{r} \quad (15)$$

wherein "Re{ }" denotes an operation of extracting a real number part of a complex number, and "$\tau = \Delta t_1 - \Delta t_2$" denotes a relative flight time difference according to a path difference between the reference beam reflected from the reflector 230 and the interrogating beam reflected from the object. Here, "$\tau$" is proportional to a relative distance of the object and thus becomes "$\Delta z \approx c\tau/2n$," wherein "c" denotes a velocity of light in a vacuum state, and "n" denotes a refraction index of a medium.

If a linearly chirped laser beam having a chirped frequency range "$\Delta f$" and a duration time "$T_o$" is used, a phase difference occurs due to a relative flight time difference occurring due to the path difference between the reference beam reflected from the reflector 230 and the interrogating beam reflected from the object. The phase difference can be expressed as in Equation 6 above.

Also, the current signal generated by the photodetector 245 may be transformed as in Equation 16 below:

$$I(\vec{r}_t,t)=\int|E_1|^2+|E_2|^2+2Re\{R_o(\vec{r}-\vec{r}_t,\Delta z)\}\times\{\int\cos[-\pi \vec{r}'^2 2z_o/\lambda(z_o^2+\Delta z^2)+\overline{\omega}_o\tau+(\Delta f/T_o)\tau t]d\lambda\}\times circ[\vec{r}'/z_o \sin\alpha]d\vec{r}' \quad (16)$$

In other words, the current signal varies in a sinusoidal form of a frequency in each laterally translated position of the object stage 235 with time.

The electronic processing unit 250 processes the current signal detected by the photodetector 245 as a digital signal to extract a 3-dimensional image of the object and includes an ADC 260, a signal processor 265, a storage 270, an object stage controller 280, and a display 275.

The elements of the electronic processing unit 250 perform the same operations as those described in the previous embodiment. However, the reference beam reflected through the reference beam lens 227 is different from that described in the previous embodiment. Thus, a frequency component at "$f_b=(\Delta f/T_o)\tau$" of the current signal processed by the signal processor 265 can be expressed as in Equation 17 below:

$$O(\vec{r}_t, f_b) = F\{I(\vec{r}_t, t)\}|_{f=f_b} \quad (17)$$

$$= \int R_o(\vec{r}-\vec{r}_t, \Delta z)\left\{\int \exp\left[\frac{-i\pi \vec{r}'^2 2z_o}{\lambda(z_o^2+\Delta z^2)}\right]d\lambda\right\} \times$$

$$circ\left[\frac{\vec{r}'}{z_o}\sin\alpha\right]d\vec{r}'$$

$$= R_o(\vec{r}, \Delta z) \otimes \left\{\int \exp\left[\frac{-i\pi \vec{r}'^2 2z_o}{\lambda(z_o^2+\Delta z^3)}\right] \\ circ\left[\frac{\vec{r}'}{z_o}\sin\alpha\right]d\lambda\right\}$$

The frequency component at "$f_b=(\Delta f/T_o)\tau$" of the current signal is stored along with a position of the object stage 235 in the storage 270. A signal stored in the storage 270 is an encoded pattern that is formed by encoding a cross-sectional image "$R_o(\vec{r},\Delta z)$" of the object and the Fresnel zone pattern at "$\Delta z=cf_bT_o/\Delta f2n$" and can be expressed as in Equation 18 below, wherein the Fresnel zone pattern has two times more Fresnel number than the Fresnel zone pattern of the previous embodiment:

$$O(\vec{r}_t,f_b)=R_o(\vec{r},\Delta z)\otimes S(\vec{r},\Delta z) \quad (18)$$

wherein "$S(\vec{r},\Delta z)=\int\exp[-i\pi \vec{r}'^2 2z_o/\lambda(z_o^2+\Delta z^2)]circ[\vec{r}'/z_o \sin\alpha]d\lambda$" denotes an encoded pattern, i.e., an interference pattern of a spherical wave having an opposite curvature. Here, since the encoded pattern is the interference pattern having the opposite curvature and is convoluted with the cross-sectional image of the object, the encoded pattern is a Fresnel zone pattern having a wavelength width varying with frequency sweeping. Here, the Fresnel zone pattern has a Fresnel number two times larger than the Fresnel number of an encoded pattern that is obtained through interference between the plane wave and the spherical wave as illustrated in FIG. 1.

Accordingly, the cross-sectional image is obtained by restoring the encoded pattern that is formed by being encoded with Fresnel zone pattern and has a lateral resolution that is improved twice as much as the lateral resolution of the optical imaging system of the previous embodiment.

The cross-sectional image "$R_o(\vec{r},\Delta z)$" of the object is restored through a convolution between the encoded pattern "$O(\vec{r}_t,f_b)$" and a field function. Here, the field function is a complex conjugate "$F(\vec{r},\Delta z)=S^*(\vec{r}_t,\Delta z)$" of an interference pattern between spherical waves having an opposite curvature at a corresponding depth location "$z=\Delta z$." The restored image is displayed on the display 275 and can be expressed as in Equation 10 above. Also, the above-described restoration algorithm is deciphered in a Fourier domain as in Equation 11 above, and a 3-dimensional PSF of the restored image is equally expressed as Equation 12 above.

However, a transfer function of the optical imaging system of the present embodiment is obtained through 2-dimensional Fourier transform of the PSF and can be expressed as in Equation 19 below:

$$H(\vec{v},\delta z)\approx\exp(-i\pi\lambda\vec{v}^2\delta z^2/2z_o)circ(\lambda\vec{v}/2 \sin\alpha) \quad (19)$$

The transfer function is different from the transfer function of the previous embodiment using the interference pattern between the plane wave and the spherical wave as an encoded pattern, in terms of two points.

First, a cut-off frequency of the transfer function doubles a cut-off frequency of a transfer function of the objective lens 225. In other words, "$v_{cutoff}=2 \sin\alpha/\lambda=2v_{max}$." Therefore, a point size of the PSF of the restored image is half of a Rayleigh limit of the objective lens 225, i.e., "$\Delta r=\lambda/4 \sin\alpha$." Thus, the point size doubles a resolution of a general wide field imaging system having the objective lens 225.

Next, a phase shift occurs due to a spatial frequency "$\vec{v}$" according to a defocused distance and quadratically increases differently from a linear relationship of a general Fresnel zone pattern according to a distance "$\delta z$." This is because a Fresnel number of an encoded pattern formed by interference between two waves having opposite curvatures varies quadratically not linearly according to a defocus. Thus, an in-focus range may expand during a restoration of the encoded pattern. Here, if the in-focus range is defined as a range in which a phase of a maximum spatial frequency "$v_{max}$" shifts by "$\pi$," the in-focus range may be "$\delta z=\sqrt{2\lambda z_o}/\sin\alpha$." The in-focus range may be expressed as "$\delta z=\lambda\sqrt{F}/\sin^2\alpha$" using "$\sin\alpha/a=a/z_o$" and "$F=2a^2/\lambda z_o$," wherein "F" denotes the Fresnel number of the encoded pattern. The in-focus range is expanded "$\sqrt{F}$" times an in-focus range of a wide field imaging system.

In the signal processor 65 of the previous embodiment and the signal processor 265 of the present embodiment, a cross-sectional image of an object to be recorded is restored through a convolution between an encoded pattern and a complex conjugate of a Fresnel zone pattern that is a field function, using the complex conjugate of the Fresnel zone pattern as the field function.

Here, the used field function may be arbitrarily selected. Such a degree of freedom enables processing of various operations during the restoration of an image. For example, a point reflectance may be placed as the object of the previous embodiment and then recorded to obtain an encoded pattern.

The encoded pattern may be used as a field function in a restoration step. This has two advantages compared to a general back propagation method.

First, if a cross-sectional image of an object to be recorded is restored using an encoded pattern of a sub-resolution point object, aberration of the optical imaging system may be offset to be removed.

Next, an algorithm used for restoring an encoded pattern from raw data has an arbitrary phase factor to be generally measured and offset. These phase factors are automatically offset and removed during restoration.

For example, an amplitude factor may be added to a field function to smoothly taper a high frequency component for apodization or enhance the high frequency component for edge enhancement.

If a field function such as "$F(\vec{r}_t, \Delta z) = S^*(\vec{r}_t, \Delta z) - c \times \text{circ}(\vec{r}_t/F_o)$" is used, and "c" is a real constant, a transfer function is "$H(\vec{v}) \approx \tilde{S}(\vec{v},0)[\tilde{S}(\vec{v},o) - c \times J_o(2\pi \vec{v} F_o)/\vec{v}]$" in a corresponding depth location "δz." Here, "$J_o(\vec{v})$" is a zero-order Bessel function.

Therefore, when "$c = 1/\pi F_o$," a transfer function is "$H(\vec{v}) \approx \tilde{S}(\vec{v},0)[\tilde{S}(\vec{v},0) - J_o(2\pi \vec{v} F_o)/\pi \vec{v} F_o]$". Since "H(0)=0," a frequency "$\vec{v}=0$" is completely suppressed, and low frequency components up to "$\Delta v = 1.22/F_o$" are gradually attenuated from "1" to "0".

If "$F_o$" is sufficiently large, this result becomes a dark field image.

As another example, if a field function such as "$F(\vec{r}_t, \Delta z) = S^*(\vec{r}_t + \frac{1}{2}\epsilon\hat{x}, \Delta z) - S^*(\vec{r}_t - \frac{1}{2}\epsilon\hat{x}, \Delta z) \approx \frac{1}{2}\epsilon(d/dx)S^*(\vec{r}_t, \Delta z)$," wherein "ε" is smaller than a resolution factor, and "$\hat{x}$" is a unit vector in an x direction, is selected, the field function indicates a gradient of the x direction in a restored image.

As another example, if a transfer function is selected as "$H(\vec{v}) \approx \tilde{S}(\vec{v},0)\sin(\pi \epsilon v_x)$," "$v_x$" is a spatial frequency of the x direction. When $\epsilon=\frac{1}{2}$, a transfer function is "$H(\vec{v}) \approx \tilde{S}(\vec{v},0)\sin(0.5\pi v_x)$" that is a field function in which a pattern "$S(\vec{r}_t, \Delta z)$" having an opposite polarity is displaced by half of a resolution factor in an x direction.

If "$S(\vec{r}_t, \Delta z)$" is understood as a spherical curvature, this transfer function corresponds to a nomarski interference contrast method. If such an operation is applied to a phase object, the operation shows a phase slope in an x direction in a nomarski method. Also, if the operation is applied to an amplitude object, the operation shows an amplitude slope in the x direction in the nomarski method.

If a difference between two encoded patterns having a depth difference that is half of an axial resolution is selected as a field function, a slope of an axial direction may be extracted.

An inverse filter such as a power fringe adjusted filter may be used to restore an image of an object to be recorded. The restoration of a cross-sectional image of the object may be represented as "$\tilde{R}_{Re}(\vec{v}, \Delta z) \approx \tilde{O}(\vec{v}, f_b)\tilde{F}^*(\vec{v}, \Delta z)$" in the Fourier domain. Here, $$\tilde{F}*(\vec{v}, \Delta z) = \frac{\tilde{S}*(\vec{v}, \Delta z)}{|\tilde{S}(\vec{v}, \Delta z)|^2 + \sigma}$$

that is a complex conjugate of a field function constituting the power fringe adjusted filter in the Fourier domain, wherein "σ" is a positive real number added to overcome a pole problem that may occur in inverse filtering. Here, if a restored cross-sectional image of an object using power fringe adjusted filter in the Fourier domain is transformed into a space domain using 2-dimensional inverse Fourier Transform, a restored cross-sectional image of an object may be obtained in the space domain.

In the above-described processing examples, "$\tilde{S}(\vec{v}, \Delta z)$" is a pattern that is a Fourier Transform of an encoded pattern of a point reflector, i.e., a Fresnel zone pattern in a frequency domain. Here, in order to obtain the pattern, Fourier Transform of an encoded pattern that is recorded through the optical imaging system of the previously described embodiments of the present invention in case of a point reflector being placed as an object to be recorded may be synthesized using a diffraction theory. Alternatively, the pattern may be obtained by Fourier Transformation of an encoded pattern that actually is recorded through the optical imaging system of the previously described embodiments of the present invention in case of a point reflector actually being placed as an object to be recorded in the optical imaging system of the previously described embodiments of the present invention.

In the above-described embodiments, if a wavelength width is wide, a numerical aperture of an objective lens is large, and an image of an object to be recorded is restored using a complex conjugate of a Fresnel zone pattern as a field function, the restored image includes an emphasized low frequency component and defocus noise. Here, in order to restore an image of an object to be recorded from an encoded pattern by correcting frequency distortion and removing defocus noise, a Fresnel zone pattern having a wide wavelength width may be transformed into a Fourier domain, and a power fringe adjusted filter as described above may be formed using the Fresnel zone pattern having a wide wavelength width in Fourier domain. Also, the power fringe adjusted filter may filter the encoded pattern to restore a cross-sectional image of the object to be recorded. Besides the power fringe adjusted filter, the cross-sectional image of the object may be restored from the encoded pattern using various filtering methods including an inverse filter and various algorithms including digital back propagation and digital holography. For example, the image restored using the Fresnel zone pattern as the field function is filtered using a filter that decreases a low frequency component but increases a high frequency component. Therefore, the restored image having passed the filter becomes a pattern including the cross-sectional image of the object and an encoded pattern between the cross-sectional image of the object and a two side band Fresnel zone pattern corresponding to a wavelength width. Here, the encoded pattern between the two side band Fresnel zone pattern and the cross-sectional image of the object operates as defocus noises when restoring the cross-sectional image of the object. The inverse filter including an inverse of a sum of the two side band Fresnel zone pattern and a constant filters the restored image having passed the filter that decreases the low frequency component and increases the high frequency component, in order to remove the defocus noises and restore the cross-sectional image of the object by extracting only the cross-sectional image of the object. The inverse filter may adopt the following processes to overcome an inverse pole problem that may occur in an inverse filtering process. First, amplitude and phase of the restored image in the Fourier domain are separated and an amplitude value of the amplitude corresponding to a pole of the inverse filter is replaced with zero. Next, a phase value of the phase corresponding to the pole of the inverse filter is replaced with an average value of nearest phase values. Thereafter, the amplitude replaced with zero is multiplied by the inverse filter in the Fourier domain. The amplitude multiplied by the inverse filter is multiplied by the processed phase so as to be the cross-sectional image of the object in the Fourier domain. Lastly, inverse Fourier Transform is performed on the cross-sectional image in the Fourier domain into a spatial domain so as to restore the cross-sectional image of the object.

As another example, in order to restore the cross-sectional image of the object from the encoded pattern, the encoded pattern is filtered by the filter that decreases the low frequency component and increases the high frequency component. Next, the filtered pattern is convoluted with the complex conjugate of the Fresnel zone pattern corresponding to a center wavelength of the wavelength width corresponding to frequency sweeping. The convoluted pattern becomes a pattern formed by encoding the cross-sectional image of the object and the two side band Fresnel zone pattern corresponding to the wavelength width. The encoded pattern is convoluted with the complex conjugate of the Fresnel zone pattern corresponding to the wavelength width to restore the cross-sectional image of the object. The restored image includes twin image noise that is well known in the digital hologram technique field. The twin image noise may be removed using various twin image noise removing methods that are well known in the digital hologram field, including the inverse filter. The above-described method may be used to solve the pole problem of the inverse filter that may occur when the inverse filter removes the twin image noise.

FIG. 4 illustrates an optical imaging system based on a coherence frequency domain reflectometry and a MachZehnder interferometer according to an embodiment of the present invention. Referring to FIG. 4, the optical imaging system of the present embodiment improves a lateral resolution twice as much as a lateral resolution of an existing wide field imaging system limited by the Rayleigh limit of the objective lens 225.

Like the optical imaging system of FIG. 1, the optical imaging system of the present embodiment may include the auxiliary interferometer 100, the power calibration unit 120, and reflective structures for refracting an interrogating beam as shown in FIG. 2(a) or 2(b).

The descriptions and illustrations of the auxiliary interferometer 100, the power calibration unit 120, and the reflective structures of the present embodiment are repeated with those illustrated in FIG. 1. Therefore, they will be omitted in the present embodiment for convenience of describing the present embodiment. Only an optical system 301 of the optical imaging system based on optical frequency domain reflectometry will be illustrated and described.

The optical system 301 includes a laser generator 310, an optical coupler 312, a first collimator 315, a second collimator 330, a beam splitter 320, a reference beam lens 327, an objective lens 325, an object stage 335, a light integrator 340, a photodetector 345, and an electronic processing unit 350.

The laser generator 310 generates a laser beam having a chirped frequency. The optical coupler 312 splits the laser beam into two laser beams that advance along two paths, respectively, and then provides the two beams to the first and second collimators 315 and 330, respectively. Here, the optical coupler 312 and the first and second collimators 315 and 330 are connected to one another through an optical fiber to transmit the laser beams split by the optical coupler 312 to the first and second collimators 315 and 330, respectively, through the optical fiber.

The first and second collimators 315 and 330 respectively transform the laser beams into parallel light and provide the parallel light to the beam splitter 320. Here, the parallel light provided from the second collimator 330 to the beam splitter 320 becomes a reference beam.

The beam splitter 320 passes the laser beam provided from the first collimator 315 to form an interrogating beam and provides the interrogating beam to the objective lens 325.

The objective lens 325 converts the interrogating beam into a spherical wave and provides the interrogating beam to an object to be recorded, and the provided interrogating beam scans the object.

Here, the objective lens 325 may be disposed between the first collimator 315 and the beam splitter 320 in front of the beam splitter 320 or between the beam splitter 320 and the object stage 335 in the rear of the beam splitter 320.

The reference beam lens 327 is installed between the second collimator 330 and the beam splitter 320 and thus transforms the reference beam provided from the second collimator 330 into a spherical wave.

As in the above-described previous embodiments, the objective lens 325 and the reference beam lens 327 may be appropriately positioned on a path of the laser beam emitted from the laser generator 310 to transform the reference beam and the interrogating beam into the spherical waves without installing the first and second collimators 315 and 330.

The interrogating beam reflected from the object interferes with the reference beam having passed the reference beam lens 327 by the beam splitter 320 so as to form an interference signal.

The light integrator 340 spatially integrates the interference signal, and the photodetector 345 detects an intensity of the interference signal according to a pattern of the interference signal to form a current signal.

The electronic processing unit 350 processes the current signal to extract spatial information of the object from the current signal. Here, the current signal processed by the electronic processing unit 350 is an encoded pattern that is formed by encoding a cross-sectional image of the object and a Fresnel zone pattern that has a Fresnel number doubling the Fresnel number illustrated with reference to FIG. 1.

The cross-sectional image of the object may be restored using the restoration method illustrated with reference to FIG. 3.

If the reference beam lens 327 disposed on a path of the reference beam is removed from the optical system 301 of the optical imaging system of the present embodiment, the reference beam is kept as the parallel light. Thus, like the optical imaging system of FIG. 1, there may be constituted an optical imaging system that is based on a coherence frequency domain reflectometry and a MachZehnder interferometer and has a lateral resolution according to a Rayleigh limit of the objective lens 325. Here, the encoded pattern may be restored using the restoration method illustrated with reference to FIG. 1 to restore the cross-sectional image of the object.

If the objective lens 325 is disposed between the first collimator 315 and the beam splitter 320 in front of the beam splitter 320 in the present embodiment, the interrogating beam reflected from the object is integrated by the light integrator 340 and formed as an image. In this case, the light integrator 340 functions to integrate light and form an image. Alternatively, the objective lens 325 may be disposed between the light integrator 340 and the beam splitter 320 to form an image and integrate light through the light integrator 340.

In the present embodiment, the optical coupler and the optical fiber may be replaced with a beam splitter and a mirror to constitute a MachZehnder interferometer including geometric optical elements. Here, if the first collimator 315 is positioned between the laser generator 310 and the beam splitter, the beam splitter may split a collimated beam, and the mirror may reflect the collimated beam, so as to apply parallel light to the reference beam lens 327 without the second collimator 330.

FIG. 5 illustrates an optical imaging system based on a coherence frequency domain reflectometry and an in-line interferometer according to an embodiment of the present invention.

The optical imaging system of the present embodiment improves a lateral resolution twice as much as a lateral resolution of an existing wide field imaging system that is limited by a Rayleigh limit of an objective lens.

Like the optical imaging system of FIG. 1, the optical imaging system of the present embodiment may include the auxiliary interferometer 100, the power calibration unit 120, and reflective structures for refracting an interrogating beam as shown in FIG. 2(a) or 2(b).

An optical system 401 of the present embodiment includes a laser generator 410, a collimator 415, a beam splitter 420, an objective lens 425, a partial reflector 430, an object stage 435, a light integrator 440, a photodetector 445, and an electronic processing unit 450.

The laser generator 410 generates a laser beam having a chirped frequency, and the collimator 415 transforms the laser beam into parallel light and provides the parallel light to the beam splitter 420. The objective lens 425 transforms the laser beam having passed the beam splitter 420 into a spherical wave.

The partial reflector 430 is disposed between the objective lens 425 and the object stage 435, particularly, disposed out of a focus of the objective lens 425. The partial reflector 430 transmits a portion of the spherical wave generated by the objective lens 425 and reflects a portion of the spherical wave. Here, the portion having passed the partial reflector 430 becomes an interrogating beam, and the portion reflected from the partial reflector 430 becomes a reference beam. The reference beam is a spherical wave like the reference beam illustrated with reference to FIG. 3. The interrogating beam having passed the partial reflector 430 is reflected from an object to be recorded and then provided to the beam splitter 420 through the partial reflector 430 and the objective lens 425. The reference beam reflected from the partial reflector 430 is also provided to the beam splitter 420.

The interrogating beam and the reference beam interfere with each other in the beam splitter 420 to form an interference signal. The interference signal is provided to the light integrator 440 to be spatially integrated. The spatially integrated interference signal is provided to the photodetector 445, and the photodetector 445 generates a current signal according to a pattern intensity of the interference signal.

The electronic processing unit 450 receives the current signal from the photodetector 445 and processes the current signal to extract spatial information of the object from the current signal. The current signal is an encoded pattern that is formed by encoding a cross-sectional image of the object and a Fresnel zone pattern that has a Fresnel number doubling a Fresnel number of a general Fresnel zone pattern.

The electronic processing unit 450 processes the current signal using the method illustrated with reference to FIG. 3 to restore the cross-sectional image of the object.

The partial reflector 430 may be positioned on a focus of the objective lens 425 in the optical system 401 of the present embodiment to constitute an optical imaging system that is based on an in-line interferometer and a coherence frequency domain reflectometry and has a lateral resolution equal to a Rayleigh limit of the objective lens 425.

Here, the laser beam reflected from the partial reflector 430 is the reference beam that is a plane wave, and the laser beam having passed the partial reflector 430 becomes the interrogating beam and then projected onto the object. The reference beam reflected from the partial reflector 430 interferes with the interrogating beam reflected from the object through the beam splitter 420 to generate the interference signal. The interference signal is spatially integrated by the light integrator 440, and the photodetector 445 generates the current signal according to the pattern intensity of the spatially integrated interference signal.

The electronic processing unit 450 processes the current signal provided from the photodetector 445 to extract the spatial information of the object from the current signal. Here, the current signal is an encoded pattern that is formed by encoding the cross-sectional image of the object and the Fresnel zone pattern. The cross-sectional image of the object may be restored using the method as that performed by the electronic processing unit 450 as illustrated with reference to FIG. 1.

The partial reflector 430 of the present embodiment may be positioned between the beam splitter 420 and the objective lens 425. Here, the partial reflector 430 may be a flat partial reflector or a concave partial reflector. If the partial reflector 430 is the flat partial reflector, parallel light having passed the beam splitter 420 is reflected from the flat partial reflector and then becomes a reference beam. In this case, the reference beam is the parallel light, and thus the current signal detected by the photodetector 445 is an encoded pattern that is formed by encoding the cross-sectional image of the object and a general Fresnel zone pattern. The current signal may be restored using the method as that performed by the electronic processing unit 450 as illustrated with reference to FIG. 1 to restore the cross-sectional image of the object. If the partial reflector 430 is the concave partial reflector, parallel light having passed the beam splitter 420 is reflected from the concave partial reflector and then becomes a reference beam. In this case, the reference beam is the parallel light, and thus the current signal detected by the photodetector 445 is an encoded pattern that is formed by encoding the cross-sectional image of the object and a Fresnel zone pattern that has a Fresnel number doubling a Fresnel number of a general Fresnel zone pattern. The current signal may be restored using the same method as that performed by the electronic processing unit 450 as illustrated with reference to FIG. 3 to restore the cross-sectional image of the object. A convex or flat partial reflector may be combined with a lens to design an optical system that functions as a flat or concave reflector and must be substantially understood as the flat or concave partial reflector 430.

FIG. 6 illustrates an optical imaging system based on a coherence frequency domain reflectometry and a Michelson interferometer according to another embodiment of the present invention.

The optical imaging system of the present embodiment improves a lateral resolution twice as much as a lateral resolution of an existing wide field imaging system limited by a Rayleigh limit of an objective lens.

Like the optical imaging system of FIG. 1, the optical imaging system of the present embodiment may include the auxiliary interferometer 100, the power calibration unit 120, and reflective structures for refracting an interrogating beam as shown in FIG. 2(a) or 2(b).

An optical system 501 of the present embodiment includes a laser generator 510, a collimator 515, an objective lens 525, a beam splitter 520, a concave reflector 530, an object stage 535, a light integrator 540, a photodetector 545, and an electronic processing unit 550.

The laser generator 510 generates a laser beam having a chirped frequency, and the collimator 515 transforms the laser beam into parallel light.

The objective lens 525 is disposed between the collimator 515 and the beam splitter 520, and the laser beam transformed into the parallel light by the collimator 515 is transformed into a spherical wave through the objective lens 525. In the present embodiment, the objective lens 525 may be appropriately positioned on a path of the laser beam to generate a spherical wave without using the collimator 515.

The beam splitter 520 reflects a portion of the laser beam transformed into the spherical wave to form a reference beam and transmits a portion of the laser beam to form an interrogating beam.

The concave reflector 530 is positioned on a path of the reference beam, and a focal point of the concave reflector 530 is positioned outside a focal area of the objective lens 530. The concave reflector 530 reflects the reference beam that is reflected from the beam splitter 520 and is the spherical wave and re-provides the reference beam to the beam splitter 520. The reference beam reflected from the concave reflector 530 becomes the spherical wave.

The interrogating beam is reflected from the object, provided to the beam splitter 520, and interferes with the reference beam through the beam splitter 520 to form an interference signal.

The interference signal is spatially integrated by the light integrator 540, and the photodetector 545 transforms the spatially integrated interference signal into a current signal according to a pattern intensity of the spatially integrated interference signal.

The electronic processing unit 550 processes the current signal output from the photodetector 545 to restore a cross-sectional image of the object. Here, the current signal has an encoded pattern that is formed by encoding the cross-sectional image of the object and a Fresnel zone pattern that has a Fresnel number doubling the Fresnel number of the Fresnel zone pattern illustrated with reference to FIG. 1. The electronic processing unit 550 restores the cross-sectional image of the object using the restoration method illustrated with reference to FIG. 3.

If a focal point of the concave reflector 530 is positioned at the focal point of the objective lens 525 in the optical system 501 of the present embodiment, there may be constituted an optical imaging system that has a lateral resolution equal to a Rayleigh limit of the objective lens 525 and is based on a coherence frequency domain reflectometry.

In this case, the laser beam generated by the laser generator 510 is transformed into parallel light by the collimator 515 and then into a spherical wave by a lens. The spherical wave is split into the interrogating beam and the reference beam by the beam splitter 520, the interrogating beam is reflected from the object, and the reference beam is reflected from the concave reflector 530. Here, since the focal point of the concave reflector 530 is positioned at the focal point of the objective lens 525, the reference beam reflected from the concave reflector 530 becomes a plane wave.

The interrogating beam that is the spherical wave reflected from the object interferes with the reference beam that is the parallel light, by the beam splitter 520. The interference signal is spatially integrated, and the photodetector 545 generates the current signal according to the pattern intensity of the interference signal. The current signal is provided to the electronic processing unit 550 to be processed so as to restore the cross-sectional image of the object. Here, the current signal may be an encoded pattern that is formed by encoding the cross-sectional image of the object and a general Fresnel zone pattern, and the cross-sectional image of the object may be restored using the restoration method illustrated with reference to FIG. 1.

The objective lens 525 of the present embodiment may be disposed between the beam splitter 520 and the object stage 535. In this case, the laser beam generated by the laser generator 510 is transformed into parallel light through the collimator 515. The beam splitter 520 reflects a portion of the laser beam transformed into the parallel light to form the reference beam and transmits a portion of the laser beam to form the interrogating beam. The concave reflector 530 positioned on the path of the reference beam reflects the reference beam that is the parallel light and provides the reflected reference beam to the beam splitter 520. The reference beam reflected from the concave reflector 530 becomes the spherical wave. The interrogating beam passes the objective lens 530, is reflected from the object, and is provided to the beam splitter 520. The reference beam and the interrogating beam interfere with each other by the beam splitter 520 to generate the interference signal.

The interference signal is spatially integrated by the light integrator 540, and the photodetector 545 generates the current signal according to the pattern intensity of the spatially integrated interference signal.

The electronic processing unit 550 processes the current signal output from the photodetector 545 to restore the cross-sectional image of the object. Here, the current signal includes an encoded pattern that is formed by encoding the cross-sectional image of the object and the Fresnel zone pattern that has the Fresnel number doubling the Fresnel number of the Fresnel zone pattern illustrated with reference to FIG. 1. The electronic processing unit 550 restores the cross-sectional image of the object using the restoration method used in the previous embodiment illustrated with reference to FIG. 3. In the present embodiment, a convex or flat reflector and a lens may be combined to constitute an optical system that functions as a concave reflector and must be substantially understood as the concave reflector 530.

FIG. 7 illustrates an optical imaging system based on a coherence frequency domain reflectometry and an in-line interferometer according to another embodiment of the present invention. The optical imaging system of the present embodiment improves a lateral resolution twice as much as a lateral resolution of an existing wide field imaging system limited by a Rayleigh limit of an objective lens.

Like the optical imaging system of FIG. 1, the optical imaging system of the present embodiment may include the auxiliary interferometer 100, the power calibration unit 120, and reflective structures for refracting an interrogating beam as shown in FIG. 2(a) or 2(b).

An optical system 601 of the present embodiment includes a laser generator 610, a collimator 615, an objective lens 625, a beam splitter 620, a concave partial reflector 630, an object stage 635, a light integrator 640, a photodetector 645, and an electronic processing unit 650.

The laser generator 610 generates a laser beam, and the collimator 615 transforms the laser beam into parallel light and projects the parallel light onto the objective lens 625. The objective lens 625 transforms the parallel light into a spherical wave and provides the spherical wave to the beam splitter 620.

The laser beam having passed the beam splitter 620 is provided to the concave partial reflector 630, and a focal point of the concave partial reflector 630 is positioned outside a focal point of the objective lens 625. A portion of the laser beam passes the concave partial reflector 630 to be an interrogating beam, and a portion of the laser beam is reflected from the concave partial reflector 630 to be a reference beam. Here, the interrogating beam and the reference beam are formed into spherical waves.

The interrogating beam reflected from an object to be recorded interferes with the reference beam reflected from the concave partial reflector 630 to form an interference signal. The interference signal passes the photodetector 645 and the electronic processing unit 650 to restore a cross-sectional image of the object. A Fresnel zone pattern of the interference signal has a Fresnel number that doubles the Fresnel number of the Fresnel zone pattern illustrated with reference to FIG. 1. Therefore, the cross-sectional image of the object is restored using the restoration method illustrated with reference to FIG. 3.

If the focal point of the concave partial reflector 630 is positioned at the focal point of the objective lens 625 in the optical system 601 of the present embodiment, there may be constituted the optical system 601 that has a lateral resolution equal to a Rayleigh limit of the objective lens 625. This is because the laser beam is transformed into a plane wave when the spherical wave output from the objective lens 625 is reflected from the concave partial reflector 630. In other words, the interrogating beam projected onto the concave partial reflector 630 is the spherical wave, while the reference beam reflected from the concave partial reflector 630 is the plane wave. Thus, the Fresnel zone pattern has the same Fresnel number as the Fresnel number of the Fresnel zone pattern illustrated with reference to FIG. 1. Accordingly, the cross-sectional image of the object is restored using the restoration method illustrated with reference to FIG. 1.

In the present embodiment, a convex or flat partial reflector and a lens may be combined to design an optical system that functions as a concave partial reflector and must be understood as the concave partial reflector 630.

In the above-described previous embodiments, a reference beam and an interrogating beam may be incident onto a photodetector to obtain an interference pattern with parallel of optical axises of the reference beam and the interrogating beam and also a reference beam and an interrogating beam may be incident onto a photodetector to obtain an interference pattern with forming an angle between the optical axises of the reference beam and the reflected interrogating beam as well by inclining a reflector or a beam splitter. The angle between the optical axises may be formed with intersecting the optical axises. Here, the interference pattern is an encoded pattern that is formed by encoding a cross-sectional image of an object to be recorded and a Fresnel zone pattern modulated with a spatial carrier, i.e., a Fresnel zone pattern of limited size having an off-axis direction. Here, the encoded pattern may be restored using the Fresnel zone pattern of limited size having the off-axis direction as a field function to obtain the cross-sectional image of the object.

Since a carrier frequency is added to the Fresnel zone pattern, a spatial frequency area is widened in an off-axis direction compared to a general Fresnel zone pattern having a limited size. Thus, if the encoded pattern that is encoded by the Fresnel zone pattern of limited size having the off-axis direction is decoded to restore the cross-sectional image of the object, a resolution of the restored cross-sectional image increases in the off-axis direction. Therefore, if the encoded patterns formed by encoding Fresnel zone patterns of limited sizes having off-axis directions in different angular directions about the optical axis of the interrogating beam overlap with one another, the overlapped pattern becomes an encoded pattern that is formed by encoding a cross-sectional image of the object and an overlap of the Fresnel zone patterns of limited size having off-axis directions in an angular direction.

If the encoded pattern is restored using an overlap of Fresnel zone patterns having different off-axis directions as a field function, a restored cross-sectional image becomes an image having a resolution increasing in each off-axis direction. For example, if a reflector 30 of FIG. 1 is inclined to form an angle between an optical axis of the reference beam incident onto the reflector and an axis perpendicular to the reflector, the reference beam is inclined and thus incident onto the imaging plane 38. Therefore, a carrier frequency is added to a Fresnel zone pattern of limited size having an off-axis direction in a direction in which a reference beam is inclined, and a spatial frequency area is widened by the addition of the carrier frequency, wherein the Fresnel zone pattern of limited size having an off-axis direction is encoded with a cross-sectional image of an object to be recorded. Here, if a reflector is inclined in different angular directions to repeat the above-described processes, and obtained patterns are overlapped with one another, the overlapped pattern become an encoded pattern that is formed by encoding a cross-sectional image of an object to be recorded and an overlap of Fresnel zone patterns of limited sizes that have resolutions increasing in each angular direction and have off-axis directions. Here, if the encoded patterns are decoded using the overlap of the Fresnel zone patterns of limited sizes that have off-axis directions as a field function, the cross-sectional image having a resolution increasing in each angular direction may be restored. Here, the encoded pattern is formed by encoding the cross-sectional image and the overlap of the Fresnel zone patterns of limited sizes having off-axis directions. In addition, the cross-sectional image may be restored using an inverse filter such as a power fringe adjusted filter corresponding to the Fresnel zone pattern.

A reflector or a beam splitter may be inclined or a wedge may be installed on a path of a reference beam or an interrogating beam to incline an optical axis of the reference beam or the interrogating beam. Thus, the optical axis of the reference beam may intersect with the optical axis of the interrogating beam to form an angle during interference.

In the previous embodiments described with reference to FIGS. 3, 4, 5, 6, and 7, a curvature of a reference beam lens or a reference beam mirror may be changed or a position of the reference beam lens may be changed. Therefore, a spherical wave that is a reference beam may have a curvature in the same direction as a reflected interrogating beam during interference. In this case, a recorded pattern is an encoded pattern that is formed by encoding a cross-sectional image of an object to be recorded and a Fresnel zone pattern of limited size formed through an overlap of spherical waves having curvatures in the same direction. Here, a complex conjugate of the Fresnel zone pattern may be used as a field function to convolute the encoded pattern with the complex conjugate of the Fresnel zone pattern so as to restore a cross-sectional image of the object. In addition, the cross-sectional image may be restored using an inverse filter such as a power fringe adjusted filter corresponding to the Fresnel zone pattern.

In the previous embodiments described with reference to FIGS. 1, 3, 4, 5, 6, and 7, if a reflector or a partial reflector has a curvature or amplitude and phase distributions, or a lens has aberration, a spatial distribution of a reference beam or an interrogating beam may be modulated or distorted. In this case, a pattern detected by a photodetector is an encoded pattern that is formed by encoding a cross-sectional image of an object to be recorded and a Fresnel zone pattern of limited size having the modulated or distorted spatial distribution.

Here, a complex conjugate of the Fresnel zone pattern may be used as a field function to convolute the encoded pattern with the complex conjugate of the Fresnel zone pattern so as to restore the cross-sectional image of the object. In addition, the cross-sectional image may be restored using an inverse filter such as a power fringe adjusted filter corresponding to the Fresnel zone pattern. Also, arbitrary phase and amplitude patterns may be positioned on a path of a reference beam or an interrogating beam to modulate a spatial distribution of the reference beam or the interrogating beam. Here, a pattern detected by a photodetector is an encoded pattern that is formed by encoding a cross-sectional image of an object to be recorded and a Fresnel zone pattern of limited size having the spatial distribution modulated by the arbitrary phase and amplitude patterns. Here, a complex conjugate of the Fresnel zone pattern may be used as a field function to convolute the encoded pattern with the complex conjugate of the Fresnel zone pattern so as to restore the cross-sectional image of the object. In addition, the cross-sectional image may be restored using an inverse filter such as a power fringe adjusted filter corresponding to the Fresnel zone pattern.

In the previous embodiments described with reference to FIGS. 1, 3, 4, 5, 6, and 7, an objective lens that projects an interrogating beam onto an object to be recorded may be realized as a reflector having a curvature. Here, the reflector must be understood as an objective lens that is well known in the field of microscopes. For example, in the previous embodiments described with reference to FIGS. 1, 3, 4, 5, 6, and 7, if a beam splitter is disposed in a position of an objective lens, and a concave reflector is positioned on a path of an interrogating beam having passed the beam splitter, the interrogating beam having passed the beam splitter is reflected from the concave reflector. Here, a spatial distribution of the reflected interrogating beam becomes a spherical wave. The reflected interrogating beam is re-incident onto the beam splitter and reflected from the beam splitter in a vertical direction. If an object to be recorded and an object stage are positioned on a path of the reflected interrogating beam, the interrogating beam is reflected from the object and then reflected from the beam splitter to be incident onto the concave reflector. The interrogating beam incident onto the concave reflector is re-reflected from the concave reflector and then passes the beam splitter to be incident onto a beam splitter as described in the previous embodiments described with reference to FIGS. 1, 3, 4, 5, 6, and 7. Next, the incident interrogating beam is reflected from the beam splitter to be formed as an image on an imaging plane. Here, the concave reflector is an objective lens that transforms a spatial distribution of an interrogating beam into a spherical wave and forms the interrogating beam reflected from an object to be recorded as an image on the imaging plane.

FIG. 8 illustrates an optical imaging system based on a coherence frequency domain reflectometry, including relay systems, according to an embodiment of the present invention. The optical imaging system of FIG. 3 will be exemplified in the present embodiment. However, the relay systems may be installed in the optical imaging systems of FIGS. 1 and 3 through 7.

Referring to FIG. 8, relay systems 700 are respectively installed between the beam splitter 220 and the reference beam lens 227, between the beam splitter 220 and the light integrator 240, and between the beam splitter 220 and the objective lens 225, i.e., respectively installed on paths of a reference beam, an interference signal, and an interrogating beam. The relay systems 700 may be installed only on one of the paths or on one or more of the paths.

In general, in an optical imaging system that is based on a coherence frequency domain reflectometry and includes a lens having a short focal length and a high numerical aperture, the beam splitter 220 should be disposed in an appropriate position to interfere a spatial distribution of a beam reflected from an object to be recorded with a spatial distribution of a reference beam. Also, a sufficient space may be required to dispose the beam splitter 220 in the appropriate position. In other words, spaces may be formed between the beam splitter 220 and the reference beam lens 227, between the beam splitter 220 and the light integrator 240, and between the beam splitter 220 and the objective lens 225, and the relay systems 700 may be respectively installed in the spaces to transmit the reference beam, an interference signal, and an interrogating beam.

The relay systems 700 may be a lens (or lenses), a prism (or prisms), a mirror (or mirrors), an image guide element (or image guide elements), a GRadient Index (GRIN) lens (or Gradient Index (GRIN) lenses), a GRIN rod (or GRIN rods), a single GRIN lens (or single GRIN lenses), a GRIN lens array (or GRIN lens arrays), a bundle of optical fibers (or bundles of optical fibers), an optical fiber plate (or optical fiber plates), an optical fiber (or optical fibers), or the like that transmit an image and/or a signal. The relay systems 700 may be installed on paths of laser beams to relay the laser beams. Thus, the relay systems 700 guide the laser beams so as to obtain an image of an object to be recorded.

A wedge, a prism, flat glass, or a variable delay optical fiber part may be positioned on the path of the reference beam or the interrogating beam or a reflector installed on the path of the reference beam may be shifted along the path of the reference beam. As a result, a length of the path according to a length of a geometrical path of the reference beam or the interrogating beam or a length of the path according to a wavelength of the reference beam or the interrogating beam, i.e., dispersion, may be corrected.

Also, an attenuator may be positioned on the path of the reference beam or the interrogating beam to reduce a difference between amplitude of the reference beam and amplitude of the interrogating beam reflected from the object so as to reduce a direct current (DC) component during optical detection.

In the previous embodiments, a cross-sectional image of an object to be recorded is restored using a plane wave and a spherical wave. However, in the previous embodiments, an optical element that transforms a laser beam into a line form may be disposed on one or more of paths of a reference beam, an interrogating beam, and an interference signal. A slit or cylinder lens may be used instead of the optical element.

If a reference beam or an interrogating beam is transform into a line form as described above, a beam exists along a line.

If the reference beam is a plane wave having a line form, a Fresnel zone pattern has a line form. Thus, a current signal processed by an electronic processing unit is an encoded pattern that is formed by encoding a cross-sectional image of an object to be recorded and the Fresnel zone pattern having the line form.

If the reference beam is a spherical wave having a line form, an encoded signal includes a cross-sectional image of an object to be recorded and a Fresnel zone pattern that has a line form and a Fresnel number doubling a Fresnel number of a general Fresnel zone pattern.

Such an encoded pattern is formed by encoding a Fresnel zone pattern having a line form and a 1-dimensional distribution and a cross-sectional image of an object to be recorded. Thus, a cross-sectional image may be restored using 1-dimensional digital decoding for reducing operation load during processing of a digital signal. Also, 2-dimensional scanning may be performed along a plane or 1-dimensional scanning may be performed along a line to extract image information. Next, the image information may be restored using 1-dimensional digital decoding to obtain a 2-dimensional cross-sectional image that is a depth image according to a line.

A Faraday isolator may be installed on the side of an output of the laser generator 10 in the previous embodiments. A laser beam output from the laser generator 10 is provided to the collimator 15 through the Faraday isolator. Here, the Faraday isolator minimizes reflections that may have a harmful effect on stability of the laser beam. When the laser beam output from the laser generator 10 is guided by an optical fiber to be provided to the collimator 15 or another part, a facet of the optical fiber may be inclined, e.g., formed at an angle of 6° or more. Thus, the reflections that may have a harmful effect on the stability of the laser beam may be reduced.

Each of optical imaging systems as described in the previous embodiments may be used as a calibration unit of each of the optical imaging systems.

If an object to be recorded has a simple, well-known reflective profile (e.g., a partial reflector), and an intensity of a signal is appropriately regularized, the detected signal includes a modulation frequency. Since most parameters are analogized or already known, a modulation frequency may be extracted using a known curve fitting method. Therefore, if a sufficient signal processing capability and stability of a laser are secured, the optical imaging systems of the embodiments of the present invention may be used as calibration units.

It has been described in the above-described embodiments that an object to be recorded is stationary. However, in a case of a biological organism, an object moving like bloodstream may be an object to be recorded.

If the object is moved as described above, magnitudes of a velocity, a position, and reflectivity of the object may be extracted at a high resolution using a coherence frequency domain reflectometry. If a single stationary point target is measured using a coherence frequency domain reflectometry having an optimal linear chirped light source, a detected signal is a sinusoidal wave of a uniform frequency with amplitude proportional to reflectivity of the single stationary point target.

If an object to be recorded moves at a constant velocity, a detected signal is a sinusoidal wave having a chirped frequency. Here, an average or nominal frequency of the detected signal depends on a Doppler upshift or downshift depending on a relative motion of the object and frequency sweeping of a light source. Therefore, if the chirped frequency is estimated, a substantial position and a velocity of a target may be obtained.

Here, an instantaneous beat frequency "$f_b$" of a single target generated by a coherence frequency domain reflectometry is given as in Equation 20 below:

$$f_b = f' \frac{2\Delta z}{c} + f_o \frac{2v}{c} + 2f' \frac{2v}{c} t \qquad (20)$$

wherein "$f_o$" denotes a known start frequency, "f'" denotes a frequency sweeping rate known in the instantaneous beat frequency, "$\Delta z$" denotes a depth range to a unknown target, "v" denotes a velocity of a laser beam of the unknown target in a vertical direction of an incident direction, and "c" denotes a velocity of light.

A first item is a constant frequency proportional to a depth range to a target, a second item is a Doppler element proportional to a velocity of the target, and a last item is chirping of a beat frequency that is the product between the velocity of the target and frequency sweeping. If there are several targets, multi-beat frequency items multiplied by a predetermined arbitrary weight are summed to form a beat signal.

Various algorithms well known in the radar analysis technique field may be used to extract Doppler information from a detected waveform.

In order to extract a depth length and velocity information, a detected waveform is multiplied by a series of de-chirping functions of "$\exp(-jKt^2)$", wherein the de-chirping functions vary with a proportional constant "K" and have second order phases varying with time. Here, each value of the proportional constant "K" is related to another Doppler velocity and known frequency sweeping, and Fourier Transform is performed on a series of de-chirped waveforms using FFT or another appropriate algorithm. Also, corresponding Doppler offset is subtracted from a signal converted from a frequency domain in order to secure a beat frequency portion in each chirp parameter according to a depth length. Thus, each target generates a peak signal from distinguishable points of depth distance (range)-velocity plane.

A series of chirped pulses may be incident onto a target, and reflected light may be processed for a plurality of pulses to extract Doppler information using a similar method to a 10.6 μm-long-range optical radar.

Also, as known in FM-CW techniques, a depth distance and Doppler information may be extracted using information included in a total of periods of frequency sweeping.

If the technique of the present invention is applied, a reference frequency is more delayed than a frequency carried from a target for a first half period of frequency sweeping. If the reference frequency is monotonously reduced for a second half period of frequency sweeping, the reference frequency is less delayed than the frequency carried from the target. Therefore, if the target is stationary, a frequency difference of a beat signal of an interferometer is equal in two portions of sweeping. However, if the target moves, a frequency is Doppler-shifted. Thus, a difference between a reference frequency and a Doppler-shifted frequency of a delayed carrier frequency varies for two half periods of frequency sweeping.

Accordingly, a depth location of a target corresponding to spectra is searched for two half periods, an average of Doppler shifted positions of the target becomes a location of the target, and a difference between average spectra and individual spectra becomes a Doppler shift.

Such an optical imaging system based on a coherence frequency domain reflectometry may be applied to an endoscope. Examples of the endoscope include a Handheld probe, a laparoscope, a surgical microscope, an imaging grinding catheter, a integrated imaging microchip, a forscan flex catheter, etc.

If an optical imaging system based on a coherence frequency domain reflectometry is applied to such an endoscope, a relay optical element may be installed on a path of an interrogating beam so that the interrogating beam reaches an object to be recorded. If a reflective plate is inclined using the method illustrated with reference to FIG. 2(*a*) or 2(*b*) to move an interrogating beam across an input window of an endoscope, the interrogating beam is relayed to an object to be recorded through a relay optical system of the endoscope. The relayed interrogating beam crosses on the object to scan the object.

Also, a needle housing having a pointed tip may be used to allow the endoscope to easily penetrate the object and used to minimize an incision. If the needle housing is used, a front portion of the endoscope is blocked with an opaque needle-shaped structure, and thus it is impossible or difficult to perform scanning through the front portion of the endoscope. If it is not easy to perform scanning through the front portion of the endoscope, a beam deflector is installed at an end of a relay optical element installed on a path of an interrogating beam to deflect the interrogating beam in a vertical direction so as to deflect the path of the interrogating beam in the vertical direction. Also, a window is formed on a side of a housing that encloses the needle housing or the endoscope. Thus, scanning is performed through the window. Here, the beam deflector may be a mirror, a prism, or the like that may reflect the interrogating beam at a predetermined perpendicular angle with an axial direction of the endoscope. A reflective surface of the beam deflector may have a curvature or an optical element capable of focusing an interrogating beam such as a ball lens may be positioned on the reflective surface of the beam deflector in order to relay the interrogating beam to an appropriate position of an object to be recorded.

As well known in the art, in the above-described embodiments of the present invention, a polarized laser beam may be used or a polarizer or the like may be used on a path of a laser beam to polarize the laser beam. Also, an analyzer may be positioned before a light integrator to obtain an image of the changes of a polarized state of beam such as birefringence according to an object to be recorded. Here, a wave plate may be positioned on a path of a laser beam to change a polarized state of light. Also, a polarizing beam splitter may be used as a beam splitter and a wave plate may be positioned on the path of the laser beam to efficiently split and polarize the laser beam.

As described above, in an optical imaging system based on a coherence frequency domain reflectometry according to the present invention, a laser beam having a chirped frequency can be split into a reference beam and an interrogating beam. Also, the interrogating beam reflected from an object to be recorded and the reference beam can be encoded to generate an interference signal. Also, a frequency difference occurring due to a path difference between the reference beam and the interrogating beam can be extracted from the encoded interference signal to obtain an encoded pattern that is formed by encoding a cross-sectional image corresponding to the frequency difference and a Fresnel zone pattern. Thus, a depth range of the object does not depend on a Rayleigh area of an objective lens but depend on a coherence length of a laser emission. Therefore, an image having a high lateral resolution in the depth range belonging to the coherence length of a laser, i.e., a total depth range, can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According an optical imaging system based on coherence frequency domain reflectometry according to the present invention, a lateral resolution can be improved. Also, Rayleigh limits can be overcome.

What is claimed is:

1. An optical imaging system based on a coherence frequency domain reflectometry, comprising:
a light source which generates an electromagnetic wave having a chirped frequency;
a splitting unit which splits the electromagnetic wave into first and second beams;
a reflecting unit which reflects the first beam and re-transmits the reflected first beam to the splitting unit;
an objective lens which projects the second beam onto an object to be recorded;
a photodetector which transforms an interference pattern into a current signal, wherein the first beam reflected from the reflecting unit interferes with the second beam reflected from the object to generate the interference pattern; and
an electronic processing unit which processes the current signal to generate an image of the object from the interference pattern,
wherein the electronic processing unit comprises:
an analog-to-digital converter (ADC) which samples the current signal output from the photodetector to transform the current signal into a digital signal; and
a signal processor which processes one of a signal provided from the ADC and a signal stored in a storage to restore an image of the object,
wherein the current signal comprises an encoded pattern that is formed by encoding a cross-sectional image of the object and a Fresnel zone pattern having a limited size, and
wherein the signal processor convolutes the encoded pattern with a complex conjugate of a field function to restore the cross-sectional image of the object.

2. The optical imaging system of claim 1, wherein the splitting unit is a beam splitter that reflects a portion of the electromagnetic wave to form a reference beam that is the first beam and transmits a portion of the electromagnetic wave to form an interrogating beam that is the second beam.

3. The optical imaging system of claim 2, wherein the interrogating beam reflected from the object interferes with the reference beam reflected from the reflecting unit by the beam splitter to generate an interference signal.

4. The optical imaging system of claim 3, further comprising a light integrator that is disposed between the beam splitter and the photodetector and spatially integrates the reference beam and the interrogating beam having passed the beam splitter.

5. The optical imaging system of claim 1, further comprising a collimator that transforms the electromagnetic wave output from the light source into parallel light and transmits the parallel light to the splitting unit.

6. The optical imaging system of claim 2, wherein the reflecting unit is one of a reflector and a concave reflector.

7. The optical imaging system of claim 6, wherein the reference beam reflected from the reflector is parallel light.

8. The optical imaging system of claim 6, further comprising a reference beam lens that is disposed between the beam splitter and the reflecting unit to transform the reference beam guided to the reflector into a spherical wave.

9. The optical imaging system of claim 6, wherein the reflecting unit is the concave reflector, and the reflecting unit reflects the reference beam reflected from the beam splitter to transform the reference beam into the spherical wave.

10. The optical imaging system of claim 6, wherein if the reflecting unit is the reflector, the objective lens is disposed between the beam splitter and the object to be recorded.

11. The optical imaging system of claim 6, wherein if the reflecting unit is the concave reflector, the objective lens is disposed between the light source and the beam splitter.

12. The optical imaging system of claim 1, wherein the electronic processing unit further comprises:

an object stage controller which generates a control signal for changing a position of an object stage on which the object is placed whenever the signal processor completes processes about an arbitrary position of the object or the storage completely stores a signal about an arbitrary position of the object; and a display which displays an image of the object processed by the signal processor.

13. The optical imaging system of claim 1, wherein the electronic processing unit further comprises:
a reflective plate controller which generates a control signal for changing a position of a reflective plate that is adjacent to the objective lens whenever the signal processor completes processes about an arbitrary position of the object or the storage completely stores a signal about an arbitrary position of the object; and
a display which displays an image of the object processed by the signal processor.

14. The optical imaging system of claim 1, wherein a relay system is installed on at least one side of a path of the electromagnetic wave output from the light source to transmit the electromagnetic wave.

15. The optical imaging system of claim 14, wherein the relay system is formed of at least one of a lens, a prism, a mirror, and an image guiding element that is able to transmit one of an image and a signal.

16. The optical imaging system of claim 1, further comprising an auxiliary interferometer that corrects non-linearity of the electromagnetic wave output from the light source.

17. The optical imaging system of claim 16, wherein the auxiliary interferometer comprises:
a first optical coupler which splits a portion of the electromagnetic wave output from the light source;
a second optical coupler which splits an electromagnetic wave transmitted from the first optical coupler; and
a photodetector unit which transforms the electromagnetic wave output from the second optical coupler into a current signal to generate an auxiliary interference signal.

18. The optical imaging system of claim 17, wherein the ADC samples the auxiliary interference signal output from the photodetector unit and the interference signal output from the photodetector.

19. The optical imaging system of claim 18, wherein the signal processor forms a new time axis for correcting frequency sweeping using the auxiliary interference signal sampled by the ADC.

20. The optical imaging system of claim 19, further comprising a power calibration unit that relieves a fluctuation of an intensity of the electromagnetic wave during frequency sweeping of the electromagnetic wave.

21. An optical imaging system based on a coherence frequency domain reflectometry, comprising:
a light source which generates an electromagnetic wave having a chirped frequency;
an objective lens which transforms the electromagnetic wave into a spherical wave;
a reflecting unit which reflects a portion of the electromagnetic wave to form a first beam and transmits a portion of the electromagnetic wave to form a second beam;
a photodetector which transforms an interference signal into a current signal, wherein the first beam reflected from the reflecting unit interferes with the second beam reflected from the object to generate the interference signal; and
an electronic processing unit which processes the current signal to generate an image of the object from the interference signal,
wherein the electronic processing unit comprises:
an ADC which samples the current signal output from the photodetector to transform the current signal into a digital signal; and
a signal processor which processes one of a signal provided from the ADC and a signal stored in a storage to restore an image of the object
wherein the current signal comprises an encoded pattern that is formed by encoding a cross-sectional image of the object and a Fresnel zone pattern having a limited size, and
wherein the signal processor convolutes the encoded pattern with a complex conjugate of a field function to restore the cross-sectional image of the object.

22. The optical imaging system of claim 21, further comprising a light integrator that is disposed on a path of the interference signal and spatially integrates the interference signal.

23. The optical imaging system of claim 21, further comprising a collimator that transforms the electromagnetic wave output from the light source into parallel light and transmits the parallel light to the objective lens.

24. The optical imaging system of claim 21, wherein the reflecting unit is one of a partial reflector and a concave partial reflector.

25. The optical imaging system of claim 21, wherein the electronic processing unit further comprises:
an object stage controller which generates a control signal for changing a position of an object stage on which the object is placed whenever the signal processor completes processes about an arbitrary position of the object or the storage completely stores a signal about an arbitrary position of the object; and
a display which displays an image of the object processed by the signal processor.

26. The optical imaging system of claim 21, wherein the electronic processing unit further comprises:
a reflective plate controller which generates a control signal for changing a position of a reflective plate that is adjacent to the objective lens whenever the signal processor completes processes about an arbitrary position of the object or the storage completely stores a signal about an arbitrary position of the object; and
a display which displays an image of the object processed by the signal processor.

27. The optical imaging system of claim 21, wherein a relay system is installed on at least one side of a path of the electromagnetic wave output from the light source to transmit the electromagnetic wave.

28. The optical imaging system of claim 27, wherein the relay system is formed of at least one of a lens, a prism, a mirror, and an image guiding element that is able to transmit one of an image and a signal.

29. The optical imaging system of claim 21, further comprising an auxiliary interferometer that corrects non-linearity of the electromagnetic wave output from the light source.

30. The optical imaging system of claim 29, wherein the auxiliary interferometer comprises:
a first optical coupler which splits a portion of the electromagnetic wave output from the light source;
a second optical coupler which splits a laser beam transmitted from the first optical coupler; and
a photodetector unit which transforms the electromagnetic wave output from the second optical coupler into a current signal to generate an auxiliary interference signal.

31. The optical imaging system of claim 30, wherein the ADC samples the auxiliary interference signal output from the photodetector unit and the interference signal output from the photodetector.

32. The optical imaging system of claim 31, wherein the signal processor forms a new time axis for correcting frequency sweeping using the auxiliary interference signal sampled by the ADC.

33. The optical imaging system of claim 21, wherein a line transforming unit is disposed on one of paths of the first beam, the second beam, and the interference signal to transform the electromagnetic wave into a line form.

34. An optical imaging system based on a coherence frequency domain reflectometry, comprising:
   a light source which generates an electromagnetic wave having a chirped frequency;
   a splitting unit which splits the electromagnetic wave into first and second beams;
   an objective lens which transforms the second beam into a spherical wave and projects the spherical wave onto an object to be recorded;
   a beam splitter which interferes the first beam with the second beam reflected from the object to be recorded to generate an interference signal;
   a photodetector which transforms the interference signal into a current signal; and
   an electronic processing unit which processes the current signal to generate an image of the object from the interference signal,
   wherein the electronic processing unit comprises:
      an ADC which transforms the current signal output from the photodetector into a digital signal; and
      a signal processor which processes one of a signal provided from the ADC and a signal stored in a storage to restore an image of the object
   wherein the current signal comprises an encoded pattern that is formed by encoding a cross-sectional image of the object and a Fresnel zone pattern having a limited size, and
   wherein the signal processor convolutes the encoded pattern with a complex conjugate of a field function to restore the cross-sectional image of the object.

35. The optical imaging system of claim 34, further comprising a light integrator that is disposed between the beam splitter and the photodetector and spatially integrates the first beam and the second beam having passed the beam splitter.

36. The optical imaging system of claim 34, further comprising a reference beam lens that transforms the first beam into a spherical wave.

37. The optical imaging system of claim 34, wherein the electronic processing unit further comprises:
   an object stage controller which generates a control signal for changing a position of an object stage on which the object is placed whenever the signal processor completes processes about an arbitrary position of the object or the storage completely stores a signal about an arbitrary position of the object; and
   a display which displays an image of the object processed by the signal processor.

38. The optical imaging system of claim 34, wherein the electronic processing unit further comprises:
   a reflective plate controller which generates a control signal for changing a position of a reflective plate that is adjacent to the objective lens whenever the signal processor completes processes about an arbitrary position of the object or the storage completely stores a signal about an arbitrary position of the object; and
   a display which displays an image of the object processed by the signal processor.

39. The optical imaging system of claim 34, wherein a relay system is installed on at least one side of a path of the electromagnetic wave output from the light source to transmit the electromagnetic wave.

40. The optical imaging system of claim 39, wherein the relay system is formed of at least one of a lens, a prism, a mirror, and an image guiding element that is able to transmit one of an image and a signal.

41. The optical imaging system of claim 34, further comprising an auxiliary interferometer that corrects non-linearity of the electromagnetic wave output from the light source.

42. The optical imaging system of claim 41, wherein the auxiliary interferometer comprises:
   a first optical coupler which splits a portion of the electromagnetic wave output from the light source;
   a second optical coupler which splits an electromagnetic wave output transmitted from the first optical coupler; and
   a photodetector unit which transforms the electromagnetic wave output from the second optical coupler into a current signal to generate an auxiliary interference signal.

43. The optical imaging system of claim 42, wherein the ADC samples the auxiliary interference signal output from the photodetector unit and the interference signal output from the photodetector.

44. The optical imaging system of claim 43, wherein the signal processor forms a new time axis for correcting frequency sweeping using the auxiliary interference signal sampled by the ADC.

45. The optical imaging system of claim 44, further comprising a power calibration unit that relieves a fluctuation of an intensity of the electromagnetic wave during frequency sweeping of the electromagnetic wave.

46. The optical imaging system of claim 34, wherein a line transforming unit is disposed on one of paths of the first beam, the second beam, and the interference signal to transform the electromagnetic wave into a line form.

* * * * *